(12) United States Patent
Yokoyama

(10) Patent No.: US 10,951,707 B2
(45) Date of Patent: Mar. 16, 2021

(54) SELECTION DEVICE, DEVICE SELECTION METHOD, AND PROGRAM

(71) Applicant: NEC Corporation, Tokyo (JP)

(72) Inventor: Jun Yokoyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 58 days.

(21) Appl. No.: 15/895,066

(22) Filed: Feb. 13, 2018

(65) Prior Publication Data

US 2018/0262569 A1 Sep. 13, 2018

(30) Foreign Application Priority Data

Mar. 8, 2017 (JP) .............................. JP2017-043519

(51) Int. Cl.
| | | |
|---|---|---|
| *G06F 15/16* | (2006.01) | |
| *H04L 29/08* | (2006.01) | |
| *H04L 12/803* | (2013.01) | |
| *H04L 12/725* | (2013.01) | |

(52) U.S. Cl.
CPC ........ *H04L 67/1097* (2013.01); *H04L 45/306* (2013.01); *H04L 47/125* (2013.01); *H04L 67/101* (2013.01); *H04L 67/1021* (2013.01)

(58) Field of Classification Search
CPC . H04L 12/1863; H04L 47/125; H04L 49/205; H04L 67/101; H04L 67/1021
See application file for complete search history.

(56) References Cited

U.S. PATENT DOCUMENTS

| | | | |
|---|---|---|---|
| 6,400,681 B1 | 6/2002 | Bertin et al. | |
| 7,657,618 B1* | 2/2010 | Rothstein | ............ H04L 67/1017 709/223 |
| 8,533,308 B1* | 9/2013 | Rothstein | .................. H04L 5/00 709/223 |
| 2004/0133577 A1* | 7/2004 | Miloushev | ............ H04W 4/027 |
| 2007/0124342 A1 | 5/2007 | Yamamoto et al. | |
| 2010/0138540 A1 | 6/2010 | Tanaka et al. | |
| 2011/0314119 A1* | 12/2011 | Kakadia | ............ H04L 67/1002 709/213 |
| 2012/0060212 A1 | 3/2012 | Inoue | |
| 2015/0143169 A1* | 5/2015 | Konta | ................. G06F 11/1092 714/6.32 |

(Continued)

FOREIGN PATENT DOCUMENTS

| | | |
|---|---|---|
| JP | H10-070571 A | 3/1998 |
| JP | 2005-136909 A | 5/2005 |

(Continued)

OTHER PUBLICATIONS

Japanese Office Action for JP Application No. 2017-043519 dated Apr. 3, 2018 with English Translation.

(Continued)

*Primary Examiner* — Oleg Survillo

(57) ABSTRACT

A selection device includes: a storage part in which connection path information indicating a connection path of a device is stored; and a selection part configured to select the device for executing a process from among the plurality of devices. The selection part is configured to select, as the devices for executing a process, the devices whose paths from a place to store data used in the process to the devices are at least partly common on the basis of the connection path information.

12 Claims, 17 Drawing Sheets

(56) References Cited

U.S. PATENT DOCUMENTS

2016/0157100 A1* 6/2016 Soderblom ........... H04L 9/3226
455/411
2018/0234481 A1* 8/2018 Bostick ................ H04W 4/029

FOREIGN PATENT DOCUMENTS

| | | |
|---|---|---|
| JP | 2005-310120 A | 11/2005 |
| JP | 2006-031096 A | 2/2006 |
| JP | 2009-159457 A | 7/2009 |
| JP | 2010-134518 A | 6/2010 |
| JP | 2010-244469 A | 10/2010 |
| JP | 2011-055139 A | 3/2011 |
| JP | 2012-053853 A | 3/2012 |
| WO | 2007/063944 A1 | 6/2007 |

OTHER PUBLICATIONS

Japanese Office Action for JP Application No. 2017-043519 dated Oct. 16, 2018 with English Translation.
Japanese Office Action for JP Application No. 2017-043519 dated Jul. 22, 2020 with English Translation.

* cited by examiner

SELECTION DEVICE, DEVICE SELECTION METHOD, AND PROGRAM

INCORPORATION BY REFERENCE

This application is based upon and claims the benefit of priority from Japanese patent application No. 2017-043519, filed on Mar. 8, 2017, the disclosure of which is incorporated herein in its entirety by reference.

TECHNICAL FIELD

The present invention relates to a selection device, a device selection method, and a program. More specifically, the present invention relates to a selection device which selects a device for executing a process from among a plurality of devices connected via a network, a device selection method, and a program.

BACKGROUND ART

Cloud computing, which executes various processes in accordance with requests from users connected via a network such as the Internet, is known.

In the system as described above, a device for executing a process is selected from among devices belonging to the system. A technique used in selection of a device for executing a process as described above is disclosed by, for example, Patent Document 1. Patent Document 1 discloses an information processing device including a service acceptance unit, a service selection policy acquisition unit, a candidate device selection unit, and a service device determination unit. For example, the candidate device selection unit determines service providing devices each of which can provide a service accepted by the service acceptance unit on the basis of service type information. The service device determination unit determines one or more service providing devices from among the service providing devices determined by the candidate device selection unit in accordance with a selection policy acquired by the service selection policy acquisition unit. According to Patent Document 1, such a configuration allows dynamic selection of a cloud service according to a user's object.

Further, a related technique is disclosed by, for example, Patent Document 2. Patent Document 2 discloses a technique for shortening a time for establishing a connection between an originating node and a destination node.

Patent Document 1: Japanese Unexamined Patent Application Publication No. JP-A 2012-053853
Patent Document 2: Japanese Unexamined Patent Application Publication No. JP-A 10-070571

According to the technique disclosed by Patent Document 1, a device for executing a process is selected on the basis of the type of a service accepted from a user, and the status of a requested device is not considered. Therefore, for example, there is a case where a plurality of processes using the same data are executed by different devices whose network paths do not overlap. As a result, for example, it is required to transmit duplicate data to each of the devices whose network paths are different, which may lead to increase of traffic. In other words, the technique disclosed by Patent Document 1 has caused a problem that network resources cannot be efficiently utilized.

Further, Patent Document 2 does not disclose any method for efficiently using network resources. Therefore, in the same way as the technique disclosed by Patent Document 1, the technique disclosed by Patent Document 2 has caused the problem that network resources cannot be efficiently utilized.

Thus, there has been a problem that, in selection of a device for executing a process, it is difficult to select a device which can efficiently utilize network resources.

SUMMARY OF THE INVENTION

Accordingly, an object of the present invention is to provide a selection device which solves the problem that, in selection of a device for executing a process, it is difficult to select a device that can efficiently utilize network resources, a device selection method, and a program.

In order to achieve the abovementioned object, a selection device as an aspect of the present invention includes:
a storage part in which connection path information indicating a connection path of a device is stored; and
a selection part configured to select the device for executing a process from among the plurality of devices.

The selection part is configured to select, as the devices for executing a process, the devices whose paths from a place to store data used in the process to the devices are at least partly common on a basis of the connection path information.

Further, a device selection method as another aspect of the present invention is a device selection method executed by a selection device including a storage part in which connection path information indicating a connection path of a device is stored. The device selection method includes:
acquiring the connection path information indicating the connection path of the device; and
selecting, as the devices for executing a process, the devices whose paths from a place to store data used in the process to the devices are at least partly common on a basis of the acquired connection path information.

Further, a non-transitory computer-readable medium storing a computer program as another aspect of the present invention is a non-transitory computer-readable medium storing a computer program comprising instructions for causing an information processing device to realize a selection unit. The information processing device includes a storage part in which connection path information indicating a connection path of a device is stored. The selection unit is configured to select the device for executing a process from among the plurality of devices.

The selection unit is configured to select, as the devices for executing a process, the devices whose paths from a place to store data used in the process to the devices are at least partly common on a basis of the connection path information.

With the configurations as described above, the present invention can provide a selection device which solves the problem that, in selection of a device for executing a process, it is difficult to select a device that can efficiently utilize network resources, a device selection method, and a program.

EXEMPLARY EMBODIMENT

First Exemplary Embodiment

Figure 1:
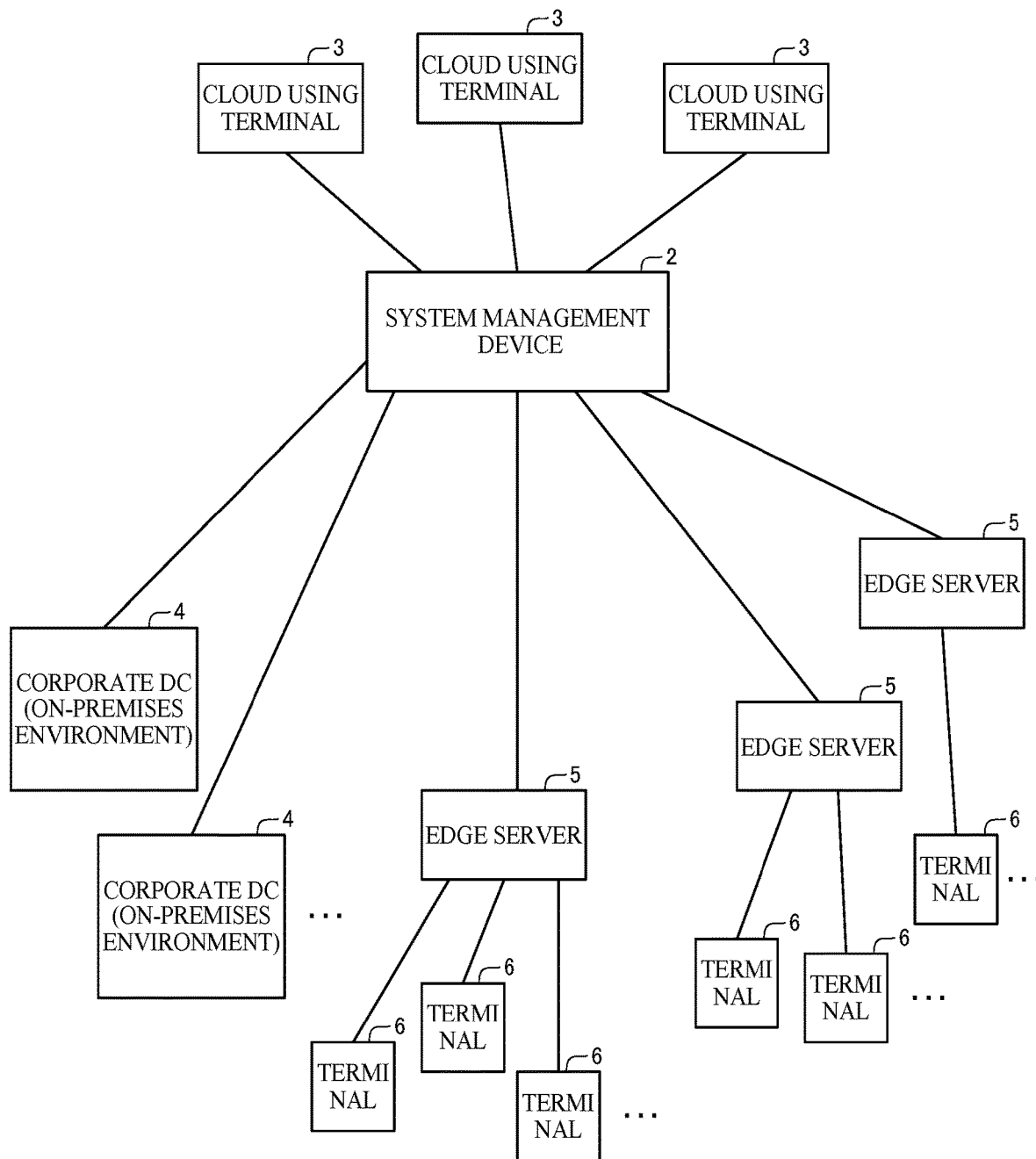
FIG. 1 is a diagram showing an example of a configuration of a whole information processing system according to a first exemplary embodiment of the present invention.
Figure 2:
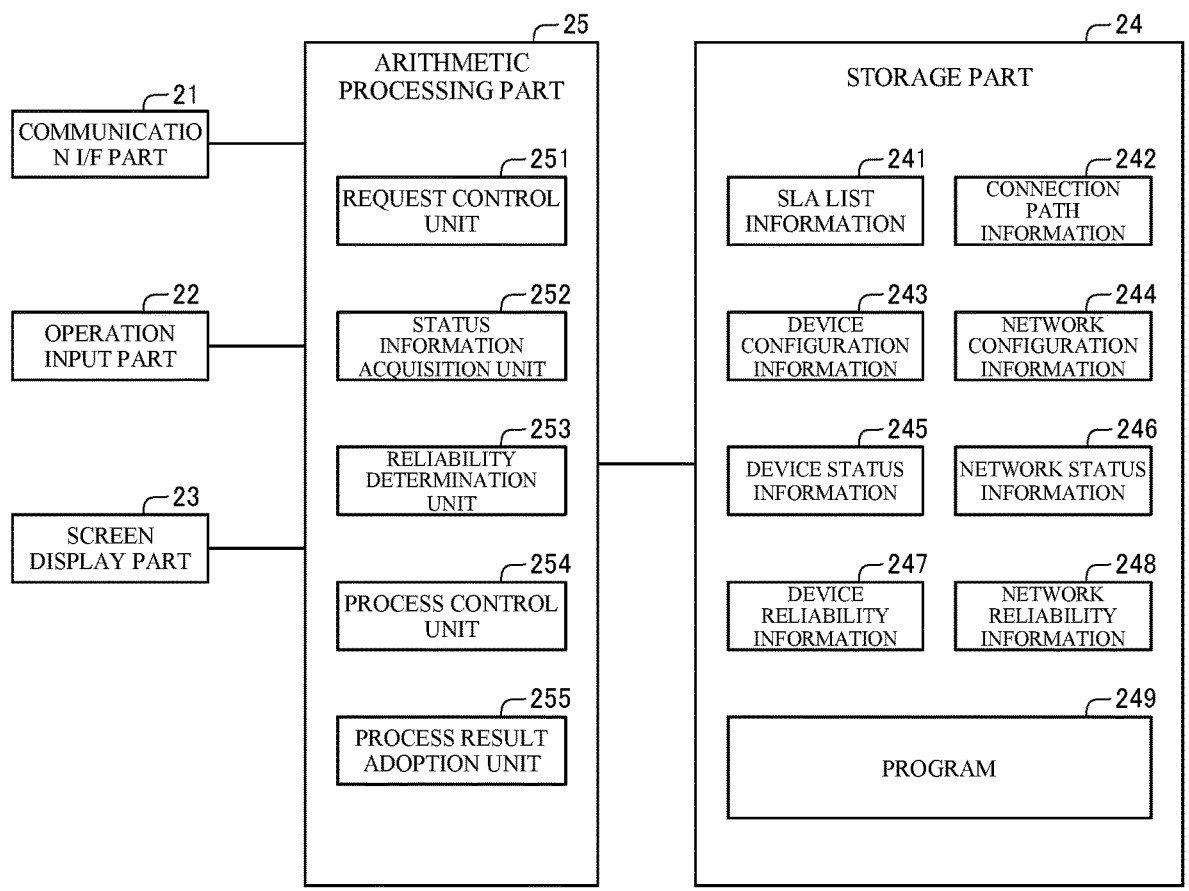
FIG. 2 is a diagram showing an example of a configuration of a system management device shown in FIG. 1.
Figure 3:
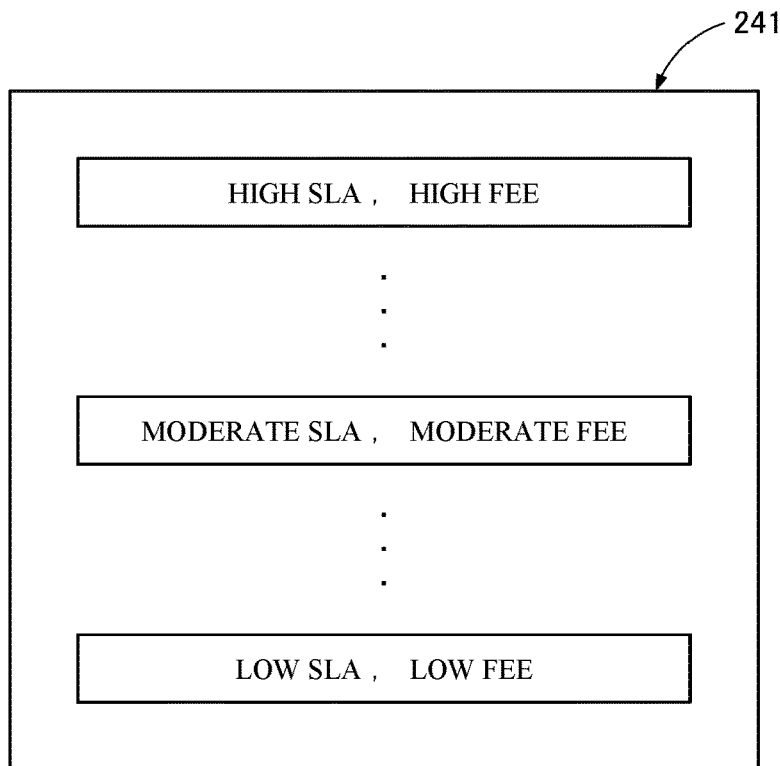
FIG. 3 is a diagram showing an example of SLA list information shown in FIG. 2.
Figure 4:
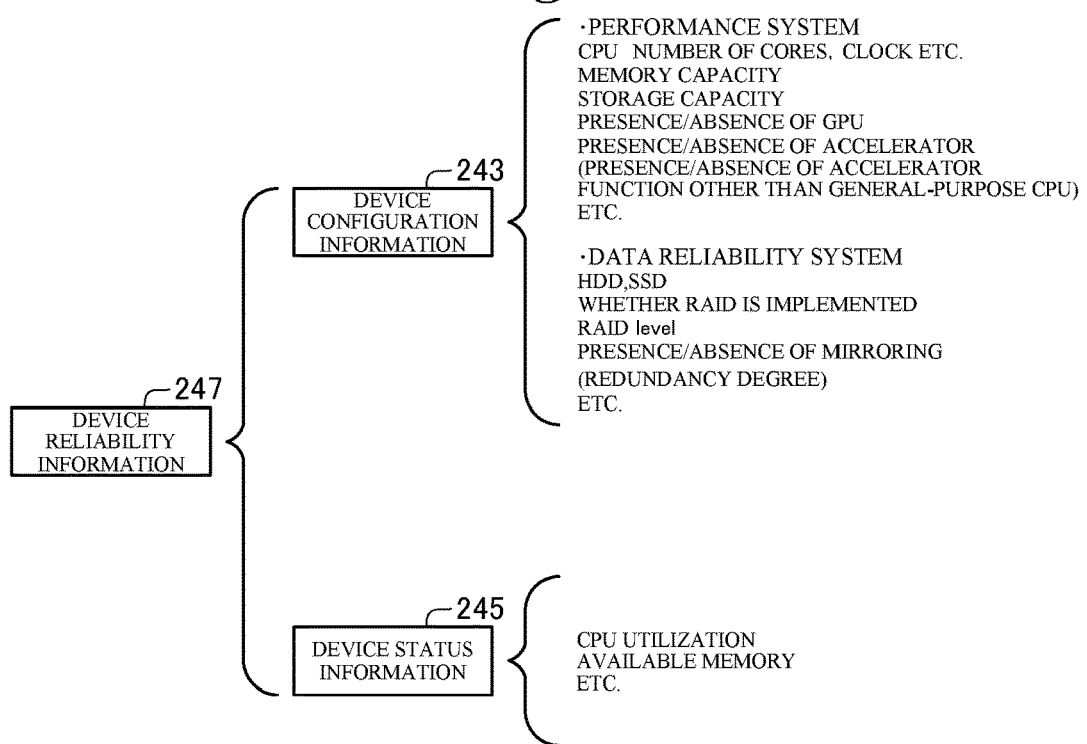
FIG. 4 is a diagram for describing device configuration information, device status information and device reliability information shown in FIG. 2.
Figure 5:
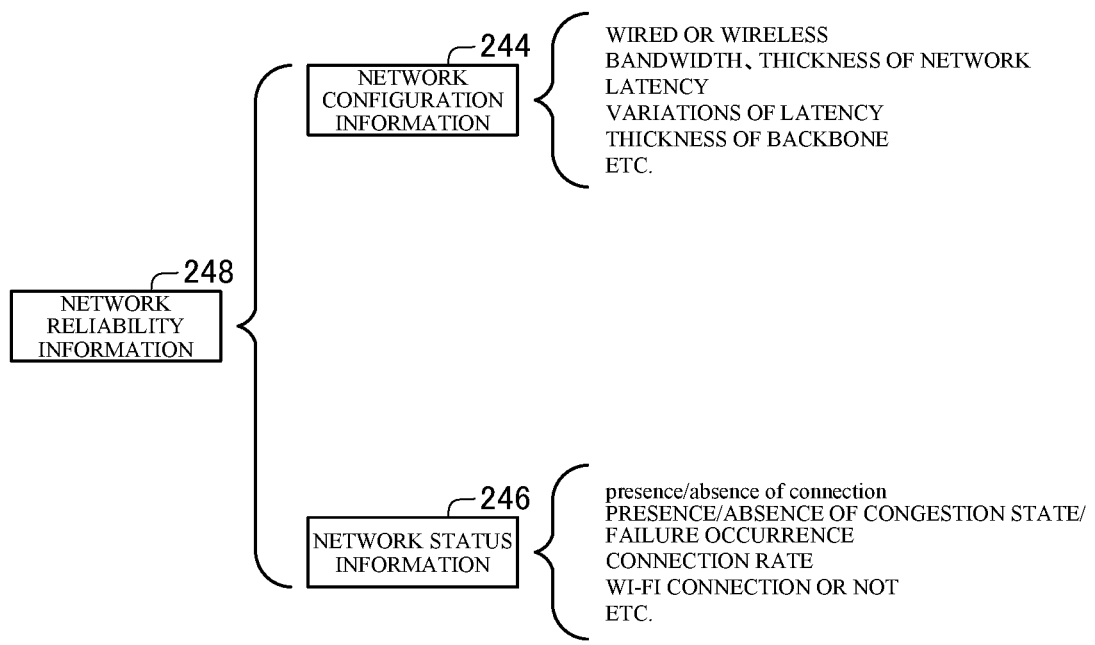
FIG. 5 is a diagram for describing network configuration information, network status information and network reliability information shown in FIG. 2.
Figure 6:
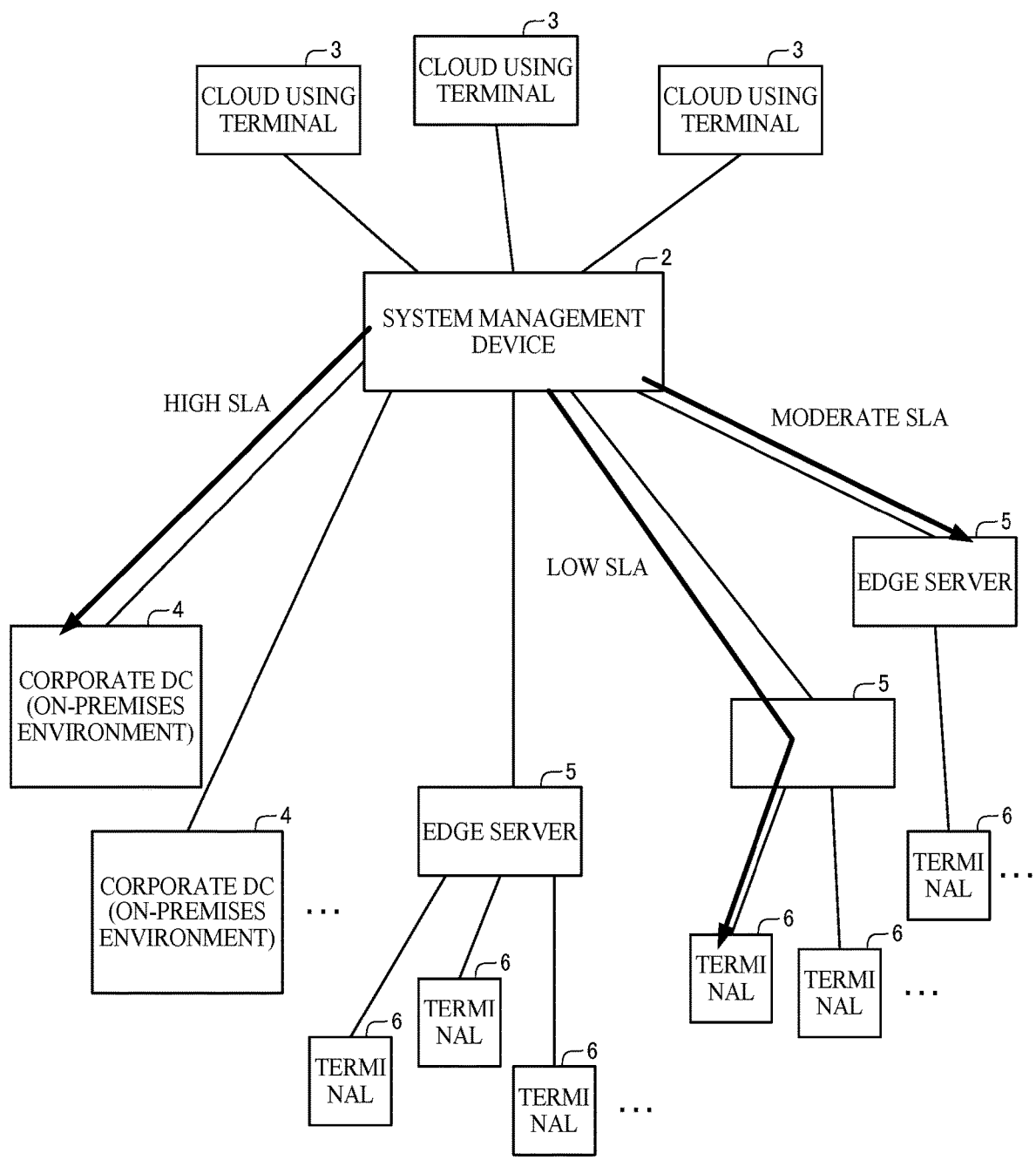
FIG. 6 is a diagram showing an example of a device determined on the basis of an SLA included by a request and reliability information.
Figure 7:
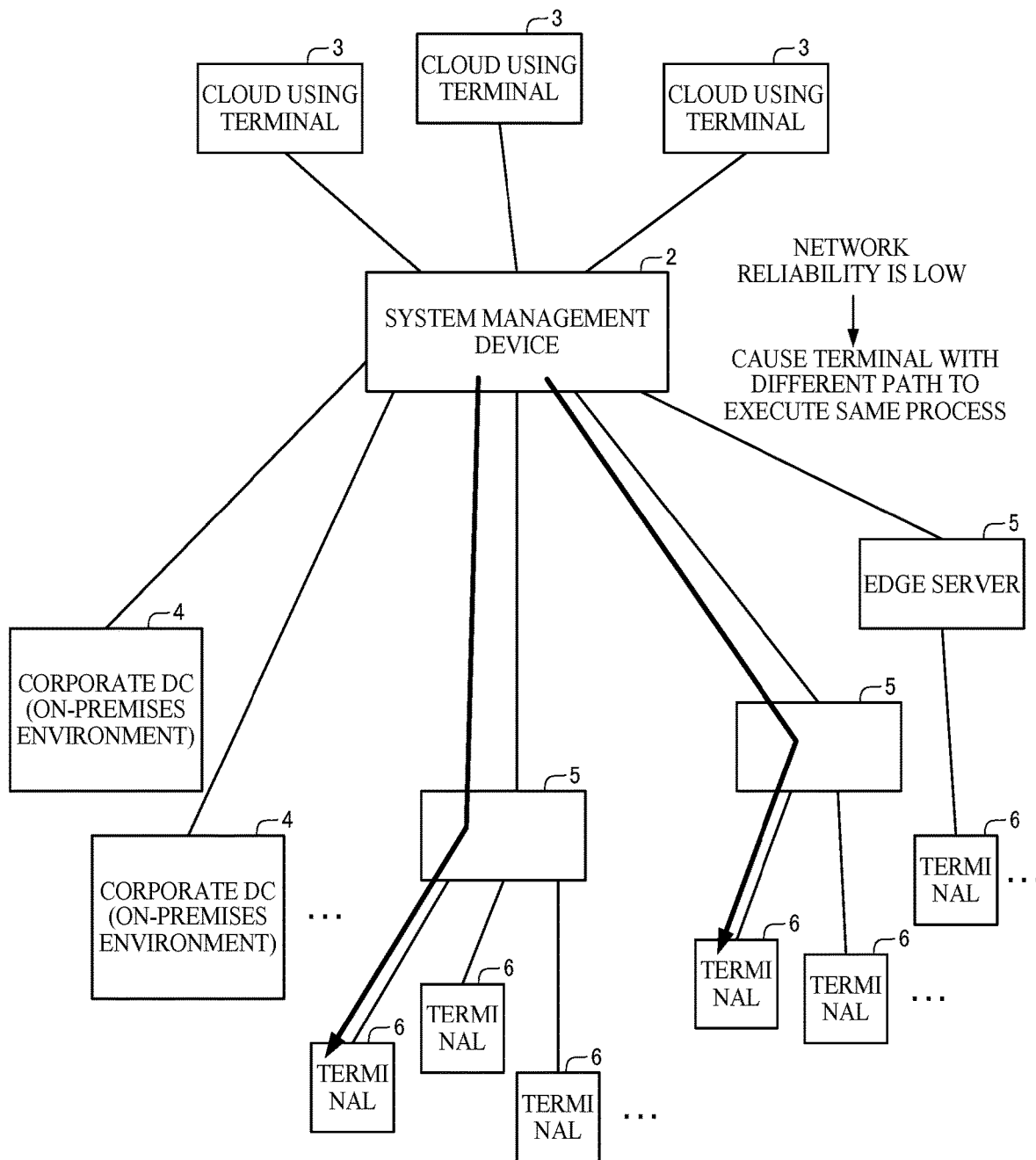
FIG. 7 is a diagram showing an example of a case of causing a device with low network reliability to execute a process.
Figure 8:
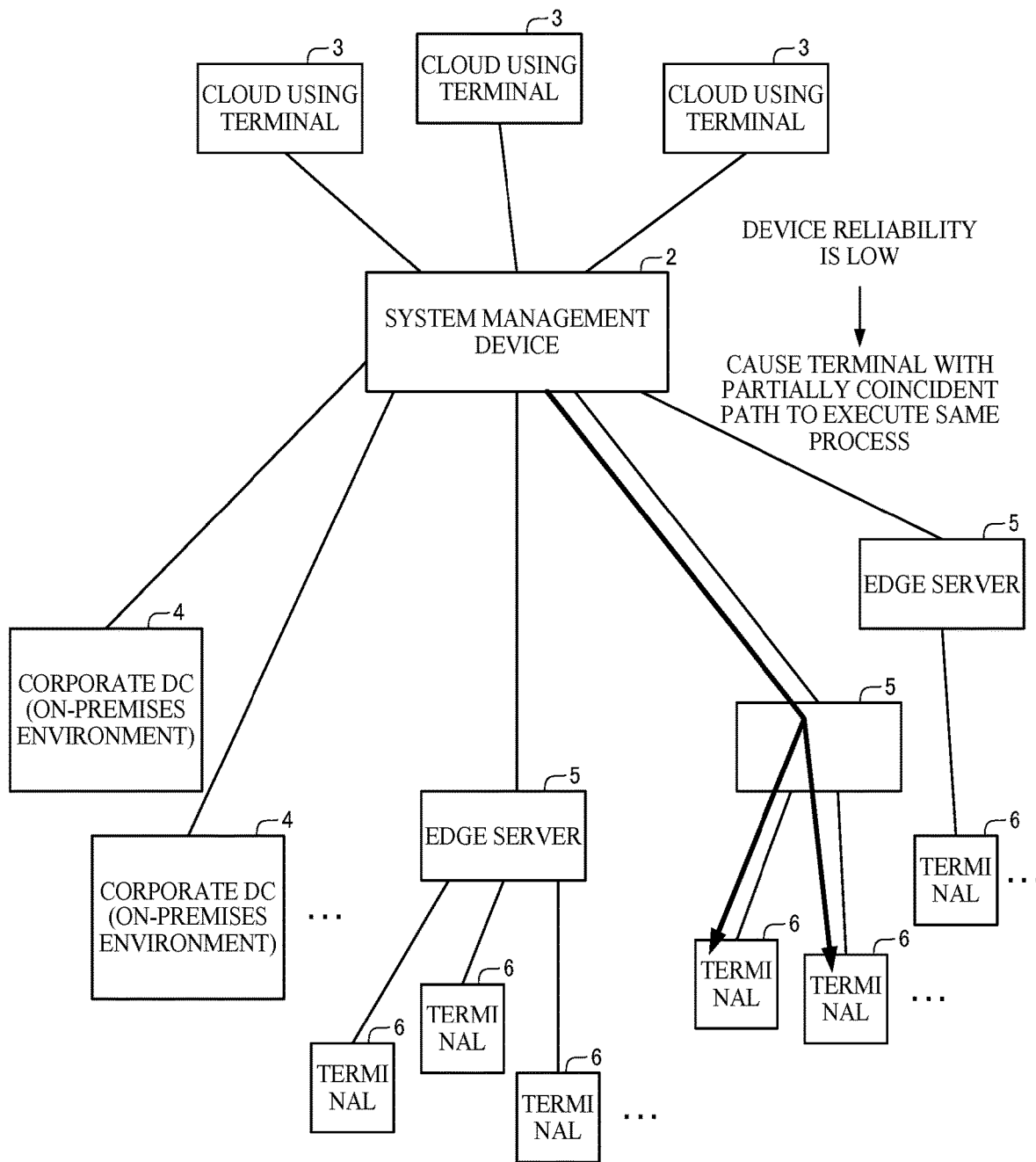
FIG. 8 is a diagram showing an example of a case of causing a device with low device reliability to execute a process.
Figure 9:
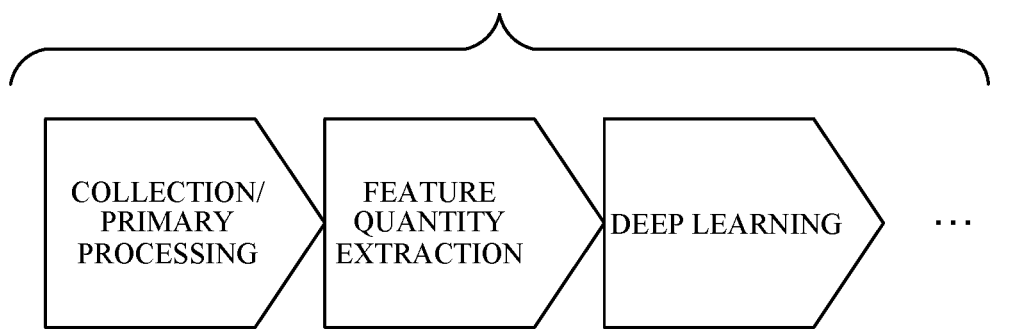
FIG. 9 is a diagram showing an example of related processes.
Figure 9:
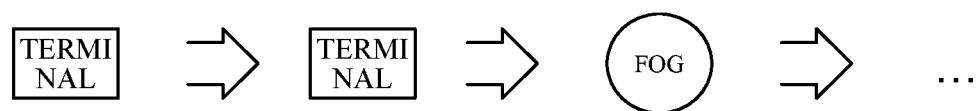
Figure 10:
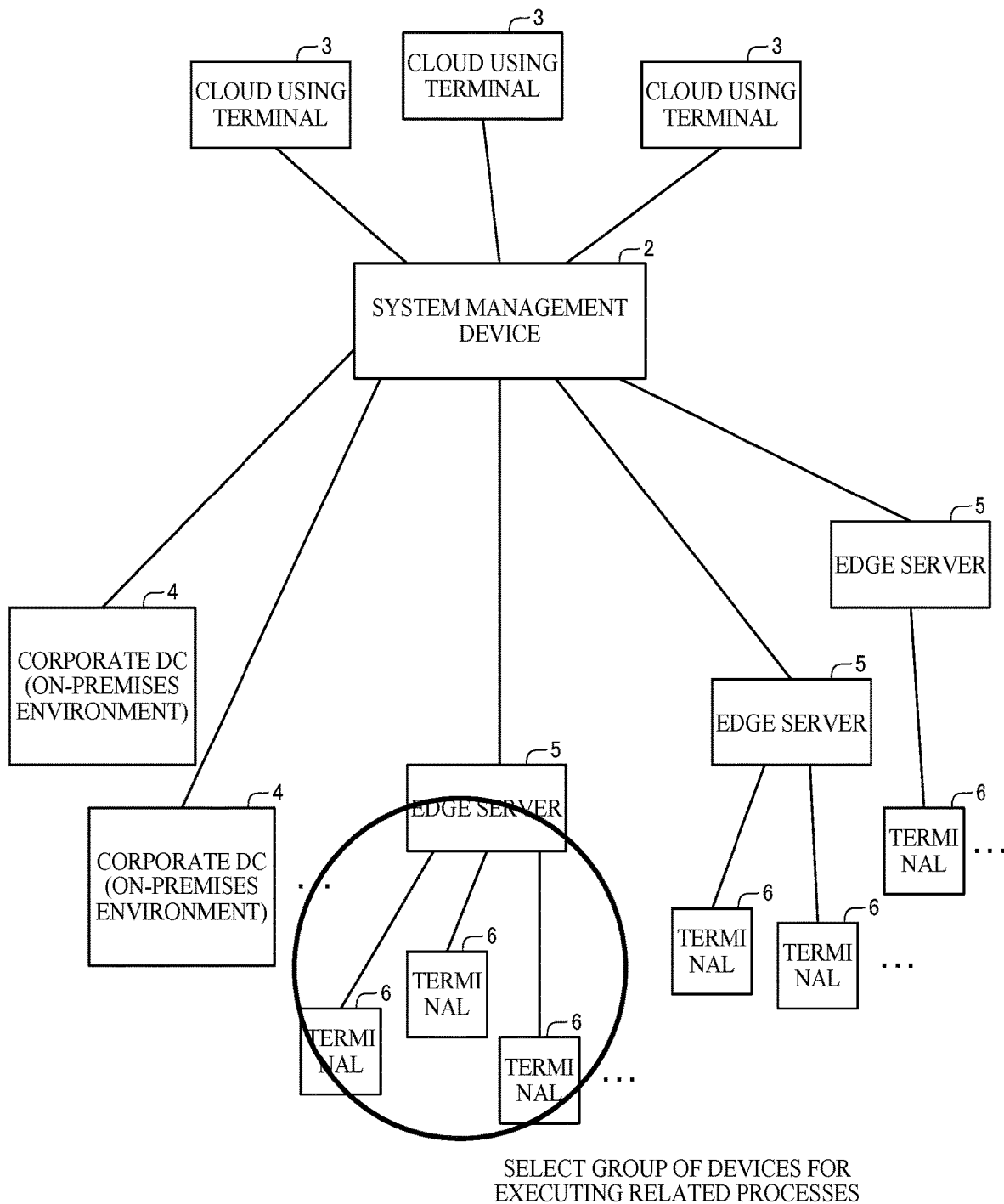
FIG. 10 is a diagram showing an example of a case of selecting a group of devices for executing related processes.
Figure 11:
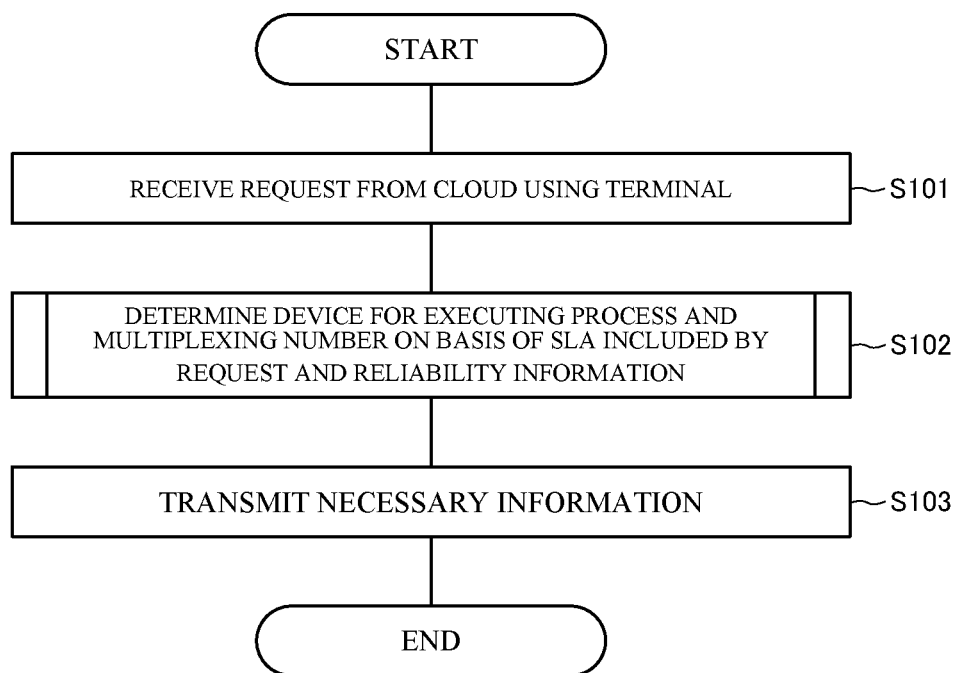
FIG. 11 is a flowchart showing an example of an overall flow when the system management device requests a process.
Figure 12:
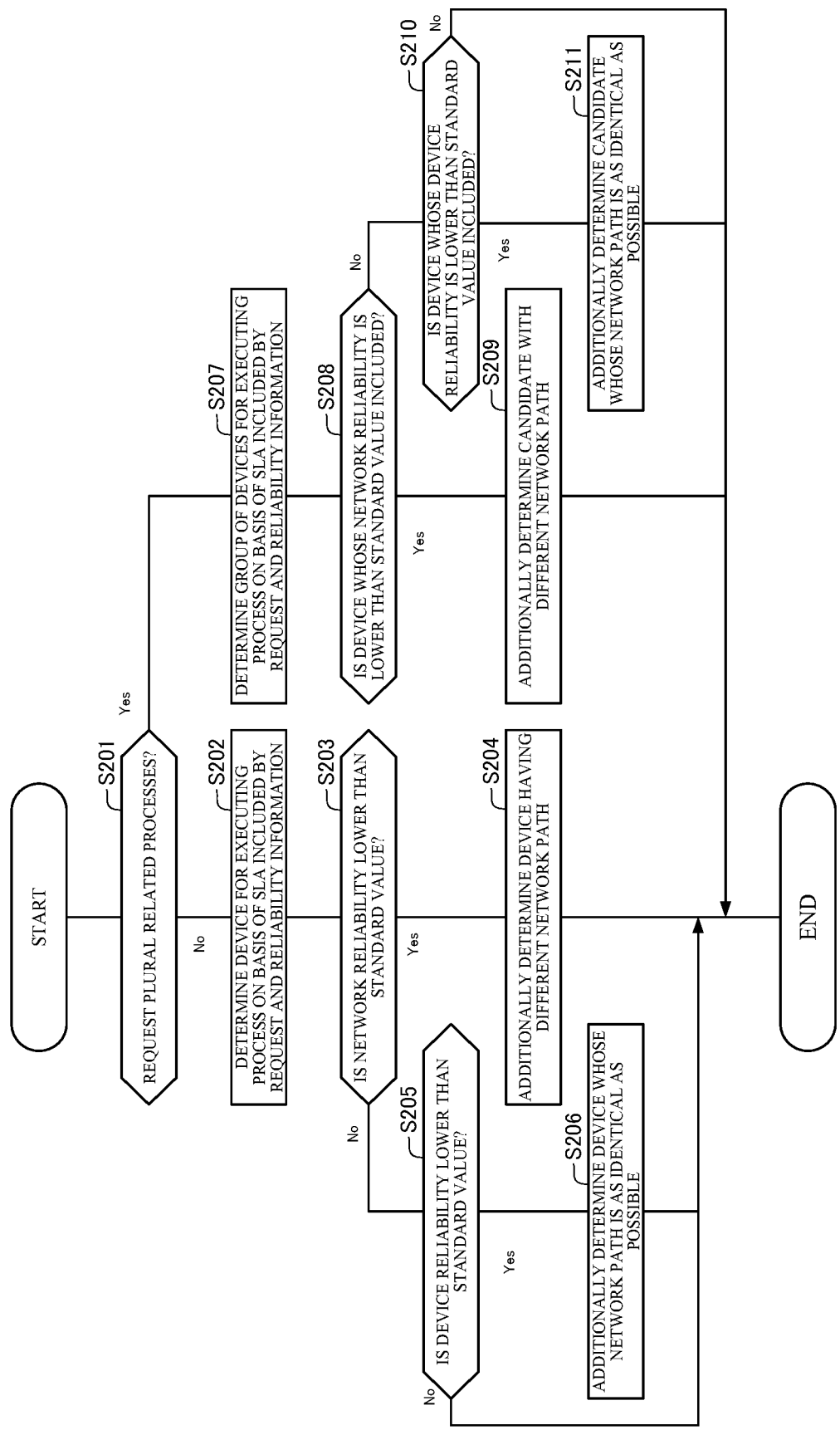
FIG. 12 is a flowchart showing an example of the details of processing at step S102 shown in FIG. 11.
Figure 13:
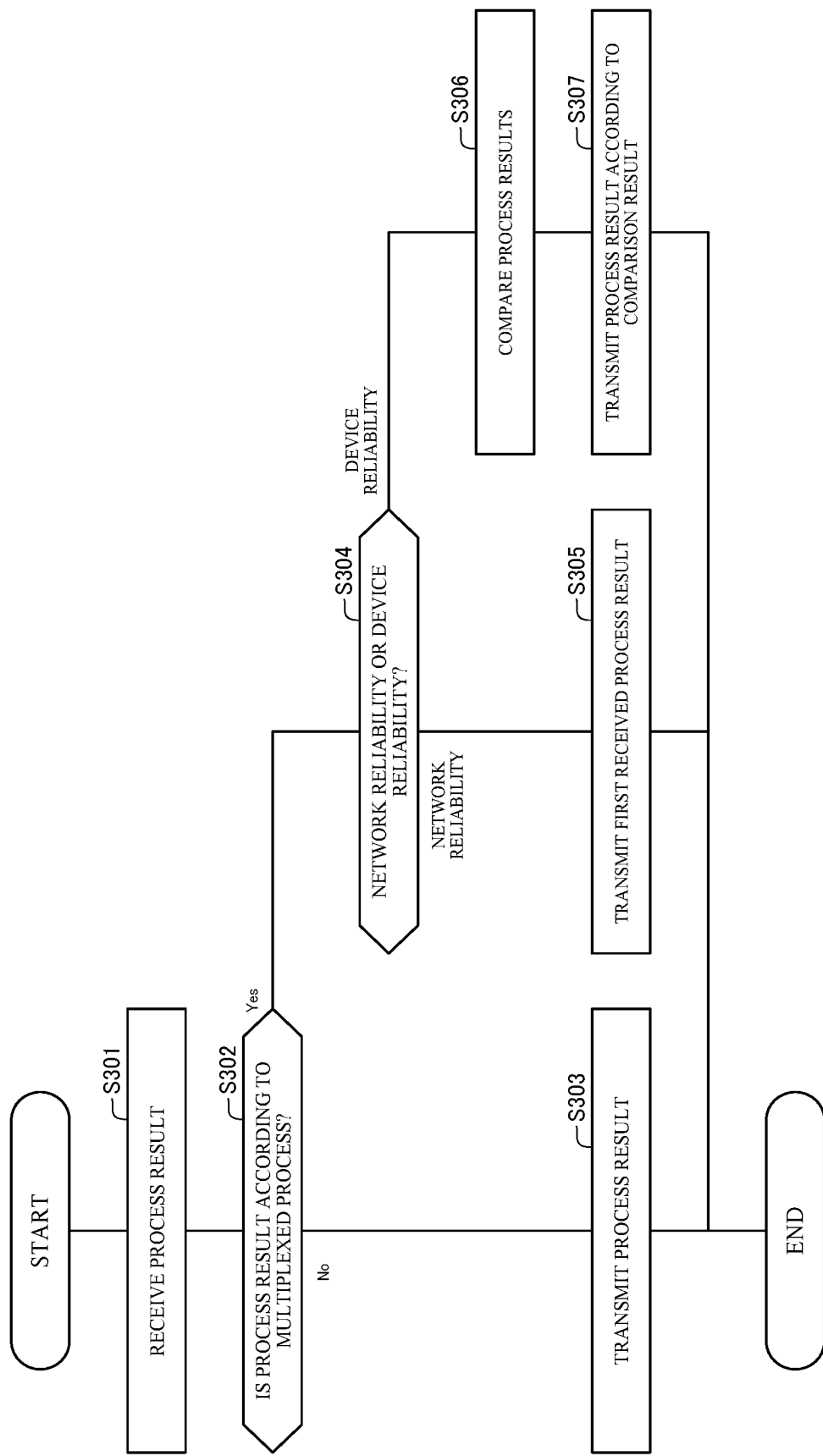
FIG. 13 is a flowchart showing an example of a process when the system management device returns a process result.

A first exemplary embodiment of the present invention will be described with reference to FIGS. 1 to 13. FIG. 1 is a diagram showing an example of a configuration of a whole information processing system 1. FIG. 2 is a diagram showing an example of a configuration of a system management device 2. FIG. 3 is a diagram showing an example of SLA list information 241. FIG. 4 is a diagram for describing device configuration information 243, device status information 245, and device reliability information 247. FIG. 5 is a diagram for describing network configuration information 244, network status information 246, and network reliability information 248. FIG. 6 is a diagram showing an example of a device determined on the basis of an SLA included by a request and reliability information. FIG. 7 is a diagram showing an example of a case of causing a device with low network reliability to execute a process. FIG. 8 is a diagram showing an example of causing a device with low device reliability to execute a process. FIG. 9 is a diagram showing an example of related processes. FIG. 10 is a diagram showing an example of a case of selecting a group of devices for executing related processes. FIG. 11 is a flowchart showing an example of an overall flow when the system management device 2 requests a process. FIG. 12 is a flowchart showing an example of the details of processing at step S102 shown in FIG. 11. FIG. 13 is a flowchart showing an example of a process when the system management device 2 returns a process result.

In the first exemplary embodiment, the information processing system 1 will be described. The information processing system 1 includes the system management device 2 (a selection device) that executes a process according to a request from a cloud using terminal 3 by utilizing excess IT (information technology) resources of previously contracted service users. As will be described later, resources utilized by the system management device 2 in this exemplary embodiment include devices with low device reliability and network reliability, such as tablets and smartphones owned by individuals. The system management device 2 in this exemplary embodiment determines a device for executing a process on the basis of an SLA (Service Level Agreement) included by a request and reliability information of each of the resources. Moreover, for example, in the case of causing a device with low device reliability and network reliability to execute a process, the system management device 2 causes a plurality of devices to execute the same process. By thus determining a device for executing a process on the basis of an SLA included by a request and reliability information of each resource and making the process multiplex as needed, it is possible to utilize various IT resources while maintaining the reliability of the process.

FIG. 1 shows an example of a configuration of the whole information processing system 1 in this exemplary embodiment. With reference to FIG. 1, the information processing system 1 in this exemplary embodiment includes the system management device 2, the cloud using terminal 3, a corporate DC (data center) 4, an edge server 5, and a terminal 6.

As shown in FIG. 1, the system management device 2 and the cloud using terminal 3 are connected so as to be able to communicate with each other via a relay device, a network and so on which are not shown in the drawings. Moreover, the system management device 2 and the corporate DC 4 are connected, the system management device 2 and the edge server 5 are connected, and the system management device 2 and a terminal 6 are connected, respectively, so as to be able to communicate with each other via a relay device, a network and so on which are not shown in the drawings. The system management device 2 and the terminal 6 may be connected via the edge server 5, or may be directly connected not via the edge server 5. The system management device 2 and the corporate DC 4 may also be connected via the edge server 5, or may be directly connected not via the edge server 5.

The numbers of the cloud using terminals 3, the corporate DCs 4, the edge servers 5 and the terminals 6 included by the information processing system 1 are not limited to those shown in FIG. 1. The information processing system 1 can include any number of cloud using terminals 3, corporate DCs 4, edge servers 5, and terminals 6.

The system management device 2 receives a request from the cloud using terminal 3. Then, the system management device 2 executes a process according to the received request by utilizing excess IT resources such as the corporate DC 4, the edge server 5 and the terminal 6. As will be described later, the system management device 2 determines a device for executing a process on the basis of an SLA included by a request and reliability information of each device such as the corporate DC 4, the edge server 5 and the terminal 6. Moreover, the system management device 2 causes a plurality of devices to execute the same process as needed, for example, in the case of causing a device with low network reliability or device reliability to execute the process.

With reference to FIG. 2, the system management device 2 includes, as major components, a communication I/F part 21, an operation input part 22, a screen display part 23, a storage part 24, and an arithmetic processing part 25.

The communication I/F part 21 is formed by a dedicated data communication circuit. The communication I/F part 21 performs data communication with the cloud using terminal 3, the corporate DC 4, the edge server 5 and the terminal 6 connected via a communication circuit.

The operation input part 22 is formed by an operation input device such as a keyboard and a mouse. The operation input part 22 detects an operation by an operator operating the system management device 2 and outputs it to the arithmetic processing device 25.

The screen display part 23 is formed by a screen display device such as an LCD (Liquid Crystal Display). The screen display part 23 displays a variety of information in accordance with an instruction from the arithmetic part 25.

The storage part 24 is a storage device such as a hard disk and a memory. In the storage part 24, process information necessary for various processes in the arithmetic processing part 25 and a program 249 are stored. The program 249 is a program which is loaded to and executed by the arithmetic processing part 25 and thereby realizes various processing parts. The program 249 is previously loaded from an external device (not shown in the drawings) or a storage medium (not shown in the drawings) via a data input and output function such as the communication I/F part 21, and stored into the storage part 24. Major information stored in the storage part 24 is, for example, SLA list information 241, connection path information 242, device configuration information 243, network configuration information 244, device status information 245, network status information 246, device reliability information 247, and network reliability information 248.

The SLA list information 241 is information transmitted to the cloud using terminal 3 by a request control unit 251. The SLA list information 241 includes, for example, as shown in FIG. 3, a plurality of SLAs which can be selected by the cloud using terminal 3 (the number of SLAs may be any number). An SLA included by the SLA list information 241 is configured so that, for example, a fee for requesting the system management device 2 to execute a process gets higher as an SLA gets higher (i.e., as a service level agreed in SLA gets higher).

An SLA may not be selected by the cloud using terminal 3 every time a request is transmitted (or for each process included in a request) but may be unique to each client (namely, each cloud using terminal 3) using the information processing system 1. In this case, for example, at the time of registration of a new cloud using terminal 3 as a service user, information associating the cloud using terminal 3 with an SLA is stored into the storage part 24. In other words, in the storage part 24, information associating information for identifying the cloud using terminal 3 with an SLA may be stored together with or instead of the SLA list information 241.

The connection path information 242 is information indicating connection paths on the network of the corporate DC 4, the edge sever 5, the terminal 6, and so on. The connection path information 242 includes information indicating connection paths between the system management device 2 and the corporate DC4, the edge server 5 and the terminal 6. The connection part information 242 may include information indicating connection paths between devices, for example, between the terminals 6, between the corporate DC 4 and the edge server 5, and the like.

The connection path information 242 is generated by, for example, at the time of newly registering the corporate DC 4, the edge server 5, the terminal 6 and the like as a service user, acquiring necessary information from the device, a relay device (not shown in the drawings) on the way of communication with the device and so on (the information may be collected by using various known methods). The connection path information 242 may be regularly updated. The connection path information 242 is utilized by a process control unit 254 and so on.

The device configuration information 243 is information indicating the configuration of a device such as the corporate DC 4, the edge server 5 and the terminal 6. The device configuration information 243 includes, for example, configuration information indicating the performance of a device and configuration information indicating data reliability. The configuration information indicating the performance of a device is, for example, the number of cores and the number of clocks of a CPU (Central Processing Unit), memory capacity, storage capacity, the presence or absence of a GPU (Graphics Processing Unit), the presence or absence of an accelerator (the presence or absence of an acceleration function other than a general-purpose CPU), and so on. The configuration information indicating data reliability is, for example, the type of storage (HDD (Hard Disk Drive), SDD (Solid State Drive), or the like), whether RAID (Redundant Arrays of Inexpensive Disks) is implemented, the RAID level if RAID is implemented, the presence or absence of mirroring, and so on. Thus, the device configuration information 243 includes static information, which is hard to change in a short term.

The device configuration information 243 is, for example, at the time of registration of a new device such as the corporate DC 4, the edge server 5 and the terminal 6 as a service user, acquired from the device and stored into the storage part 24. The device configuration information 243 is used by, for example, a reliability determination unit 253.

The network configuration information 244 is information indicating the configuration of a network to which the corporate DC4, the edge server 5, the terminal 6 and so on are connected. The network configuration information 244 includes information indicating, for example, whether the network is wired or wireless, a bandwidth, the thickness of the network, the thickness of a backbone, latency, the variation of latency by time of day, and so on. Thus, the network configuration information 244 includes static information, which is hard to change in a short term.

The network configuration information 244 is, for example, at the time of registration of a new device such as the corporate DC 4, the edge server 5 and the terminal 6 as a service user, acquired by acquisition of necessary information from the device, a relay device (not shown in the drawings) on the way of communication with the device or the like, and stored into the storage part 24. The network configuration information 244 is used by, for example, the reliability determination unit 253.

The device status information 245 is information indicating the status of a device such as the corporate DC 4, the edge server 5 and the terminal 6. The device status information 245 includes information indicating, for example, CPU utilization, available memory, and so on. Thus, unlike the device configuration information 243, the device status information 245 includes dynamic information, which changes with a temporal element, for example.

The device status information 245 is, for example, regularly acquired by a status information acquisition unit 252 and stored into the storage part 24. The device status information 245 may be acquired by the status information acquisition unit 252 at a timing for request for execution of a process. The device status information 245 is used, for example, by the reliability determination unit 253.

The device status information 245 can include information indicating a device status tendency estimated on the basis of the regularly acquired device status information 245. The information indicating a device status tendency is, for example, CPU utilization by time of day (an estimated value) and previously estimated by the status information acquisition unit 252.

The network status information 246 is information indicating the status of the network to which the corporate DC 4, the edge server 5, the terminal 6 and so on are connected. The network status information 246 includes, for example, information indicating the presence or absence of connection of a device, whether the network is in the congestion state, whether there is a failure in the network, and whether Wi-Fi connection is available. Thus, unlike the network configuration information 244, the network status information 246 includes dynamic information, which changes with a temporal element, for example.

The network status information 246 is, for example, regularly acquired by the status information acquisition unit 252 and stored into the storage part 24. The network status information 246 may be acquired by the status information acquisition unit 252 at a timing for request for execution of a process. The network status information 246 is used by, for example, the reliability determination unit 253.

In the same way as the device status information 245, the network status information 246 can include information indicating a network status tendency estimated on the basis of the regularly acquired network status information 246. The information indicating the network status tendency is, for example, a connection rate (an estimated value), a congestion and failure occurrence rate (an estimated value) or the like by time of day, and previously estimated by the status information acquisition unit 252.

The device reliability information 247 is, as shown in FIG. 4, information generated by the reliability determination unit 253 on the basis of the device configuration information 243 and the device status information 245. The device reliability information 247 indicates the reliability of a device such as the corporate DC 4, the edge server 5 and the terminal 6.

Device reliability indicated by the device reliability information 247 represents a probability of occurrence of an error in a process result. Device reliability is expressed with the use of a plurality of stages such as values 1 to 100 or ten stages. For example, device reliability is generated by the reliability determination unit 253 so as to become a higher value as device performance and data reliability get higher, for example, CPU performance is high, available storage is present, and RAID is implemented. Moreover, device reliability indicated by the device reliability information 247 is generated by the reliability determination unit 253 so as to become a higher value as the device is more fit to execution of a new process, for example, CPU utilization is low, and available memory is present. Thus, the device reliability information 247 has a value based on the device configuration information 243 and the device status information 245.

In a case where device reliability is generated in the abovementioned manner, it shows that, as a value indicated by device reliability is higher, a probability of occurrence of an error in a process result is lower. Therefore, as will be described later, the process control unit 254 causes a device with higher device reliability to execute a process as a requested SLA is higher.

As shown in FIG. 5, the network reliability information 248 is information generated by the reliability determination unit 253 on the basis of the network configuration information 244 and the network status information 246. The network reliability information 248 indicates the reliability of the network to which the corporate DC 4, the edge server 5, the terminal 6 and so on are connected.

Network reliability indicated by the network reliability information 248 represents an availability of communication with a device such as the corporate DC 4, the edge server 5 and the terminal 6 (whether a requested content reaches the device, whether a process result from the device reaches the system management device 2). The network reliability is expressed with the use of a plurality of stages, for example, values 1 to 100, ten stages, or the like. For example, the network reliability is generated by the reliability determination unit 253 so as to become a higher value as the performance of the network is better, for example, a bandwidth and the network are thick, latency is small, and so on. Moreover, the network reliability is generated by the reliability determination unit 253 so as to become a higher value as the status of the network is better, for example, not LTE (Long Term Evolution) connection but Wi-Fi connection is available, it is not in the congestion state, and there is no failure. Thus, the network reliability information 248 has a value based on the network configuration information 244 and the network status information 246.

In a case where the network reliability is generated in the abovementioned manner, it represents that, as a value indicated by the network reliability is higher, a transmitted content reaches a destination without any trouble. Therefore, as will be described later, the process control unit 254 causes a device with higher network reliability to execute a process as a requested SLA is higher.

The arithmetic processing part 25 has a microprocessor such as an MPU and a peripheral circuit thereof. The arithmetic processing part 25 loads the program 249 from the storage part 24 and executes it, thereby realizing various processing parts by causing the hardware described above and the program 249 to cooperate. Major processing parts realized by the arithmetic processing part 25 are the request control unit 251, the status information acquisition unit 252 (a status information acquisition part), the reliability determination unit 253, the processing control unit 254 (a selection part), and a process result adoption unit 255.

The request control unit 251 receives a request including information indicating an SLA from the cloud using terminal 3. Moreover, the request control unit 251 transmits the received information to the process control unit 254.

For example, the request control unit 251 transmits the SLA list information 241 as shown in FIG. 3 to the cloud using terminal 3 via the communication I/F part 21. In the cloud using terminal 3 having received the SLA list information 241, an SLA according to a process to be requested and a fee is selected by the user of the cloud using terminal 3. Then, the cloud using terminal 3 transmits a request including information indicating the SLA to the system management device 2. After that, the request control unit 251 receives the request including the information indicating the SLA from the cloud using terminal 3. Then, the request control unit 251 transmits the received information to the process control unit 254.

For example, by the method as described above, the request control unit 251 receives information indicating an SLA from the cloud using terminal 3.

The request control unit 251 can be configured to store a received request into, for example, the storage part 24 or a storage device which is not shown in the drawings and manage it for a predetermined period (for example, until a response to the request is returned to the cloud using terminal 3). In this case, when a time up to the deadline of a response to the request becomes a predetermined level or less (for example, within one day; may be any level), the request control unit 251 can instruct the process control unit 254 to cause a device such as the corporate DC 4, the edge server 5 and the terminal 6 to execute a process again. In other words, the request control unit 251 can instruct to execute a process again on the basis of information indicating the deadline of a response according to the process. Moreover, the request control unit 251 may be configured to, when requesting to execute a process again, increase the SLA by a predetermined level (for example, in a case where the original LSA requests the terminal 6 with low device reliability and low network reliability, at the time of execution of a process again, change to an SLA requesting a device with higher device reliability and network reliability than the original ones (for example, the edge server 5)). Consequently, it becomes possible to more securely execute a process.

The status information acquisition unit 252 acquires the device status information 245 and the network status information 246, for example, for each predetermined period. Then, the status information acquisition unit 252 stores the acquired device status information 245 and network status information 246 into the storage part 24.

For example, the status information acquisition unit 252 performs communication with a device such as the corporate DC 4, the edge server 5 and the terminal 6, a relay device (not shown in the drawings) on the way of communication with the device or the like and acquires the device status information 245 and the network status information 246. In this exemplary embodiment, a method by which the status information acquisition unit 252 acquires the device status information 245 and the network status information 246 is not specifically limited. The status information acquisition unit 252 can acquire the device status information 245 and the network status information 246 by using various known methods, for example, by using SNMP (Simple Network Management Protocol), ICMP (Internet Control Message Protocol) or the like.

Further, the status information acquisition unit 252 can be configured to estimate information indicating the tendency of a device status and information indicating the tendency of a network status by using the device status information 245 and the network status information 246 stored in the storage part 24. The status information acquisition unit 252 estimates CPU utilization (an estimated value) at certain time and CPU utilization (an estimated value) for each time of day on the basis of CPU utilization for each predetermined time shown by the device status information 245 stored in the storage part 24, for example. Moreover, the status information acquisition unit 252 estimates a congestion and failure occurrence rate (an estimated value) for each time of day on the basis of the presence or absence of congestion and failure for each predetermined time indicated by the network status information 246 stored in the storage part 24, for example. Then, the status information acquisition unit 252 stores the device status information 245 and the network status information 246 including the information indicating the estimated results as described above into the storage part 24. The status information acquisition unit 252 may perform estimation other than the illustrated above. The status information acquisition unit 252 can perform various estimations based on the device status information 245 and the network status information 246 stored in the storage part 24.

The reliability determination unit 253 generates the device reliability information 247 indicating device reliability on the basis of the device configuration information 243 and the device status information 245 stored in the storage part 24. The reliability determination unit 253 also generates the network reliability information 248 indicating network reliability on the basis of the network configuration information 244 and the network status information 246 stored in the storage part 24. Then, the reliability determination unit 253 stores the generated device reliability information 247 and the generated network reliability information 248 into the storage part 24. In this exemplary embodiment, a timing that the reliability determination unit 253 generates the device reliability information 247 and the network reliability information 248 is not specifically limited. The reliability determination unit 253 can generate the device reliability information 247 and the network reliability information 248 at any timing.

For example, the reliability determination unit 253 generates device reliability so as to be a higher value as device performance indicated by the device configuration information 243 and data reliability are higher, for example, CPU performance is high, there is available storage, and RAID is implemented. Moreover, the reliability determination unit 253 generates device reliability so as to be a higher value as the status of the device indicated by the device status information 245 is better, for example, CPU utilization is low and there is available memory. Besides, the reliability determination unit 253 can generate device reliability with information indicating a device status tendency estimated by the status information acquisition unit 252 added.

Meanwhile, in this exemplary embodiment, it is not specifically limited which of the device configuration information 243 and the device status information 245 is valued by the reliability determination unit 253 when device reliability is generated. The reliability determination unit 253 may generate device reliability by adding a value based on the device configuration information 243 and a value based on the device status information 245, or may generate device reliability by multiplying a value based on the device configuration information 243 and a value based on the device status information 245. Furthermore, the reliability determination unit 253 may calculate device reliability after executing predetermined weighting on a value based on the device configuration information 243 or a value based on the device status information 245.

Further, for example, the reliability determination unit 253 generates network reliability so as to be a higher value as the performance of the network indicated by the network configuration information 244 is better, for example, a bandwidth and the network are thick, and latency is small. The reliability determination unit 253 also generates network reliability so as to be a higher value as the status of the network indicated by the network status information 246 is better, for example, not LTE (Long Term Evolution) connection but Wi-Fi connection is available, the network is not in the congestion state, and there is no failure. Furthermore, the reliability determination unit 253 can generate network reliability with information indicating a network status tendency estimated by the status information acquisition unit 252 added.

Meanwhile, in this exemplary embodiment, it is not specifically limited which of the network configuration information 244 and the network status information 246 is valued by the reliability determination unit 253 when network reliability is generated. The reliability determination unit 253 may generate network reliability by adding a value based on the network configuration information 244 and a value based on the network status information 246, or may generate network reliability by multiplying a value based on the network configuration information 244 and a value based on the network status information 246. Furthermore, the reliability determination unit 253 may calculate network reliability after executing predetermined weighting on a value based on the network configuration information 244 or a value based on the network status information 246.

The process control unit 254 determines a device for executing a process according to a request from the cloud using terminal 3 on the basis of information received from the request control unit 251 (that is, an instruction from the cloud using terminal 3), the device reliability information 247, and the network reliability information 248. Then, the process control unit 254 transmits information indicating a process content, a resource reservation period and a result transmission destination to the determined device. Moreover, the process control unit 254 causes a plurality of devices to execute the same process, for example, in a case where the network reliability or device reliability of the determined device is low.

For example, in a case where a request from the cloud using terminal 3 is not a request for a plurality of related processes, for example, a request for a single process, the process control unit 254 determines a device for executing the process on the basis of an SLA included by the request, the device reliability information 247, and the network reliability information 248. For example, the process control unit 254 calculates a standard of a value of device reliability and a standard of a value of network reliability on the basis of the SLA included by the request. Then, the process control unit 254 determines to cause a device with higher device reliability and network reliability than the standards based on the SLA to execute the process. For example, as shown in FIG. 6, in a case where the SLA included by the request is high enough, the process control unit 254 determines to cause the corporate DC 4 with high device reliability and high network reliability to execute the process. In a case where the SLA included by the request is moderate, the process control unit 254 determines to cause the edge server 5 with moderate device reliability and moderate network reliability to execute the process. In a case where the SLA included by the request is low, the process control unit 254 determines to cause the terminal 6 with low device reliability and low network reliability to execute the process.

Thus, the process control unit 254 determines to cause the following device to execute a process; a device in which both device reliability indicated by the device reliability information 247 and network reliability indicated by the network reliability information 248 are more than standards determined on the basis of an SLA shown by a request. Meanwhile, the storage capacities and CPU performances of the respective corporate DCs 4 are different from each other, and network environments of the respective corporate DCs 4 are also different from each other. Therefore, the value of device reliability and the value of network reliability vary for each corporate DC 4. Accordingly, including a plurality of options into the SLA list information 241 allows the process control unit 254 to execute more detailed control. To be specific, for example, in a case where a request requires a higher SLA among high SLAs, the process control unit 254 can control, for example, so as to cause the corporate DC 4 with higher device reliability and higher network reliability among the corporate DCs 4 to execute a process. This is true for the edge servers 5 and the terminals 6. Moreover, it is possible that there is the edge server 5 whose device reliability and network reliability are higher than those of the corporate DC 4 with low device reliability and network reliability. Allocating the corporate DC 4 for a high SLA, allocating the edge server 5 for a moderate SLA and allocating the terminal 6 for a low SLA is merely an example, and the process control unit 254 can determine a device for executing a process without being limited to the case illustrated above.

Further, the following case is assumed; as a result of the abovementioned determining, the process control unit 254 determines to cause a device, such as the edge server 5 and the terminal 6, with lower network reliability than a predetermined standard value to execute a process. In this case, it is anticipated that a requested process content does not reach the device such as the edge server 5 and the terminal 6 or a process result transmitted from the device such as the edge server 5 and the terminal 6 does not reach the system management device 2. Then, in the case as described above, the process control unit 254 determines to cause another device (for example, a device with low network reliability likewise) to execute the same process (see FIG. 7). In the determining, the process control unit 254 refers to the connection path information 242 and, as another device for executing the same process, selects a device whose network path from the system management device 2 is different from that of the determined device. By thus causing devices with different paths to execute the same process, it is possible to reduce a probability that information does not reach any of a plurality of devices for executing the same process.

Meanwhile, the number of process multiplexing (redundancy) by the process control unit 254 may be set to any number. For example, in the case of causing a device with low network reliability to execute a process, the process control unit 254 may cause one or two other devices to execute the same process at all times. The process control unit 254 may control the number of multiplexing in accordance with the level of network reliability. For example, the process control unit 254 may be configured to cause more devices to execute a process as network reliability is lower.

Further, the following case is assumed; as a result of the abovementioned determining, the process control unit 254 determines to cause a device, such as the edge server 5 and the terminal 6, with lower device reliability than a predetermined standard value to execute a process (the predetermined value may be the same value as or a different value from the value determined for network reliability). In this case, there is a probability that the result of a requested process is wrong, so that the process control unit 254 determines to cause another device (for example, a device with low device reliability likewise) to execute the same process (see FIG. 8). In the determining, it is desirable that, with reference to the connection path information 242, the process control unit 254 selects, as another device for executing the same process, a device whose network path from the system management device 2 serving as a place to store a requested content (data) is as coincident with that of the determined device as possible (for example, a device which passes the same base station or the same relay device, a device which is close in logical position). By thus making at least part of the network paths coincide, the need for transmitting a plurality of duplicate data through different paths is eliminated, so that increase of traffic can be inhibited. In other words, it becomes possible to efficiently use network resources.

Meanwhile, the number of process multiplexing by the process control unit 254 may be set to any number as in a case where network reliability is low. For example, in the case of causing a device with low device reliability to execute a process, the process control unit 254 may cause one or two other devices to execute the same process at all times. The process control unit 254 may control the number of multiplexing in accordance with the level of device reliability. For example, the process control unit 254 may be configured to cause more devices to execute a process as device reliability is lower.

Further, for example, as shown in FIG. 9, there is a case where a request from the cloud using terminal 3 is a request for a plurality of related processes. With reference to FIG. 9, related processes are, for example, collection/primary processing, feature quantity extraction with the use of the result of the collection/primary processing, deep learning with the use of the result of the feature quantity extraction, and so on. In other words, there is a case where a request from the cloud using terminal 3 is a request for a plurality of related processes including a first process and a second process using the result of the first process.

In a case where a plurality of related processes are thus requested, the process control unit 254 determines a group of devices for executing the processes on the basis of an SLA included by the request, the device reliability information 247, and the network reliability information 248 (see FIG. 10).

For example, in the case of related processes shown in FIG. 9, a device with high arithmetic performance is needed in deep learning. It is assumed that a relatively high SLA is set accordingly. On the other hand, it is assumed that, for collection/primary processing and feature quantity extraction, a low SLA is set. In this case, the process control unit 254 firstly determines, as a device for executing deep learning, the edge server 5 with higher device reliability and network reliability than standards determined on the basis of the relatively high SLA. That is, the process control unit 254 firstly selects from among devices few included by the information processing system 1 (fewer options), for example, a device with high necessary device reliability and network reliability. Subsequently, with reference to the connection path information 242 or the like, the process control unit 254 determines, as a device for executing collection/primary processing and feature quantity extraction, the terminal 6 which is logically or physically close in distance to the selected edge server 5. Otherwise, the process control unit 254 determines a device for executing collection/primary processing and feature quantity extraction in accordance with, for example, a bandwidth which can be reserved between the device and the selected edge server 5. Thus, the process control unit 254 firstly selects a given device and thereafter selects a device with a connection path satisfying a given condition, such as a device located in a short distance from the firstly selected device, thereby determining a group of devices to execute related processes. By thus determining a group of devices, for example, at the time of transmission of a process result from a device for collection/primary processing to a device for feature quantity extraction, a distance for data transmission gets short, so that increase of traffic can be inhibited.

Further, in a case where the determined group of devices include a device with lower network reliability than a predetermined standard value, the process control unit 254 determines to cause another group of devices with different network paths to execute the same process. Thus, the process control unit 254 makes a process multiplex on a group-of-devices basis. Consequently, it becomes possible to cause devices to securely execute a process while inhibiting increase of traffic. The process control unit 254 may be configured to multiplex only a process to be executed by a device with low network reliability. A flow of making a process multiplex is the same as in the case described with reference to FIG. 7 and therefore will be omitted. The standard value may be an identical standard value to or a different standard value from that of a case other than the case of related processes.

Further, in a case where the determined group of devices include a device with lower device reliability than a predetermined standard value, the process control unit 254 determines to cause another group of devices (for example, whose network paths are as coincident as possible) to execute the same process. Thus, the process control unit 254 makes a process multiplex on a group-of-devices basis as in the case of low network reliability. The process control unit 254 may be configured to multiplex only a process to be executed by a device with low device reliability. A flow of making a process multiplex is the same as in the case described with reference to FIG. 8 and therefore will be omitted. The standard value may be an identical standard value to or a different standard value from that of a case other than the case of related processes.

In the case of making a process multiplex, the process control unit 254 designates the system management device 2 as the destination for transmission of a result. On the other hand, in the case of not making a process multiplex, the process control unit 254 may designate the cloud using terminal 3 as the destination for transmission of a result. That is, the process control unit 254 may be configured to transmit the result of a process not via the system management device 2.

The process result adoption unit 255 receives the result of a process from a device requested to execute the process. Then, the process result adoption unit 255 transmits the received process result to the cloud using terminal 3 having requested to execute the process. Moreover, the process result adoption unit 255 can be configured to, in a case where the received process result is a process result according to a multiplexed process, execute a process as needed and thereafter transmit the process result.

For example, in a case where the received process result is a process result according to a process which has not been multiplexed, the process result adoption unit 255 transmits the received process result as it is to the cloud using terminal 3. On the other hand, in a case where the received process result is a process result according to a multiplexed process, the process result adoption unit 255 executes a process according to what multiplexing of the process results from. For example, the process result adoption unit 255 executes processes according to the respective cases; a case where a process has been multiplexed because network reliability is low and a case where a process has been executed because device reliability is low.

For example, in a case where a process has been multiplexed due to low network reliability, the process result adoption unit 255 transmits a process result received the earliest to the cloud using terminal 3. On the other hand, in a case where a process has been multiplexed due to low device reliability, the process result adoption unit 255 compares and checks process results received from the respective requested devices. Then, the process result adoption unit 255 selects a process result to adopt by majority voting or the like, and transmits the selected process result to the cloud using terminal 3.

Thus, the process result adoption unit 255 executes a process depending on whether a process result is a result of a multiplexed process and why a multiplexed process has been executed. Meanwhile, the process result adoption unit 255 may transmit or adopt a process result by a method other than illustrated above. For example, the process result adoption unit 255 may be configured to, in a case where a process has been multiplexed due to low network reliability, after first receiving a process result, wait for a process result from another device for a predetermined period. In this case, the process result adoption unit 255 can be configured to transmit the result of comparison of process results received within a predetermined period to the cloud using terminal 3. The process result adoption unit 255 may be configured to, in a case where a process has been multiplexed due to low device reliability, after first receiving a process result, also wait for a process result from another device for a predetermined period.

The above is an example of the configuration of the system management device 2.

FIG. 2 shows an example of the configuration of the system management device 2 configured by a single information processing device. However, the system management device 2 may be configured by a plurality of information processing devices. In other words, the system management device 2 may be configured by a plurality of information processing devices each having one or more functions; for example, an information processing device having a function as the request control unit 251, and an information processing device having a function as the status information acquisition unit 252.

The cloud using terminal 3 is an information processing device that transmits a request to the system management device 2. The cloud using terminal 3 is, for example, a personal computer, a tablet, a smartphone, or the like. In this exemplary embodiment, the configuration of the cloud using terminal 3 is not specifically limited.

The corporate DC 4 is a data center in an on-premises environment. The corporate DC 4 has a storage device and an arithmetic device such as a CPU. In general, the device reliability and the network reliability of the corporate DC 4 are relatively higher than those of the edge server 5 and the terminal 6.

The edge server 5 is a server device or the like that is present between the cloud or the system management device 2 and the terminal 6. The edge server 5 may be configured by a single server device, or may be a group of devices configured by a plurality of server devices and executing a process called edge computing. The edge server 5 can also be called a fog server. The edge server 5 may be a group of devices that execute fog computing.

The terminal 6 is, for example, a personal computer, a tablet, a smartphone or the like, owned by an individual. In general, the device reliability and the network reliability of the terminal 6 are relatively lower than those of the corporate DC 4 and the edge server 5. On the other hand, in general, the number of the terminals 6 is more than the numbers of the corporate DCs 4 and the edge servers 5. According to this exemplary embodiment, a process is multiplexed in accordance with device reliability and network reliability, so that it is possible to effectively utilize excess IT resources of the terminals 6, which are many, without affecting the reliability of process execution.

Meanwhile, in this exemplary embodiment, regarding a specific configuration, any of the corporate DC 4, the edge server 5 and the terminal 6 is not limited as well as the cloud using terminal 3.

Next, with reference to FIGS. 11 to 13, an example of a process flow in the system management device 2 will be described. First, with reference to FIG. 11, an example of an overall flow when the system management device 2 requests a process.

With reference to FIG. 11, the request control unit 251 of the system management device 2 receives a request from the cloud using terminal 3 (step S101). Then, the request control unit 251 transmits the received information to the process control unit 254. The request received by the system management device 2 includes information indicating an SLA.

The process control unit 254 of the system management device 2 determines a device for executing a process on the basis of the SLA included by the request, the device reliability information 247, and the network reliability information 248. In a case where the network reliability and the device reliability of the determined device are low, the process control unit 254 causes a plurality of devices to execute the same process. Thus, the process control unit 254 determines a device for executing a process and also determines the number of process multiplexing on the basis of the SLA included by the request, the device reliability information 247, and the network reliability information 248 (step S102).

The process control unit 254 transmits necessary information to the determined device (step S103). For example, the process control unit 254 transmits a process content, a resources reservation period and information indicating a result transmission destination. In the case of having determined to make the process multiplex, the process control unit 254 transmits necessary information to the respective determined devices.

The above is an example of the overall flow when the system management device 2 requests a process. Next, with reference to FIG. 12, the process at step S102 will be described in more detail.

With reference to FIG. 12, the process control unit 254 checks whether or not a request from the cloud using terminal 3 requires a plurality of related processes (step S201).

In a case where the request does not require a plurality of related processes (step S201, No), the process control unit 254 determines a device for executing a process on the basis of an SLA included by the request, the device reliability information 247 and the network reliability information 248 (step S202). For example, the process control unit 254 calculates a standard of a device reliability value and a standard of a network reliability value on the basis of the SLA included by the request. Then, the process control unit 254 determines to cause a device having higher device reliability and network reliability than the standards based on the SLA to execute the process.

Subsequently, the process control unit 254 checks whether or not the network reliability of the determined device is lower than a predetermined standard value (step S203).

In a case where the network reliability is lower than the standard value (step S203, Yes), the process control unit 254 determines to cause another device (for example, a device with low network reliability likewise) to execute the same process (step S204). In the determining, the process control unit 254 refers to the connection path information 242 and selects, as the device for executing the same process, a device whose network path from the system management device 2 is different. The number of process multiplexing (redundancy) by the process control unit 254 may be set to any number.

On the other hand, in a case where the network reliability is equal to or more than the standard value (step S203, No), the process control unit 254 checks whether or not the device reliability is lower than the standard value (step S205).

In a case where the device reliability is lower than the standard value (step S205, Yes), the process control unit 254 determines to cause another device (for example, a device with low device reliability likewise) to execute the same process (step S206). In the determining, the process control unit 254 refers to the connection path information 242 and selects, as the device for executing the same process, a device whose network path from the system management device 2 serving as a place for storing a requested content (data) is as coincident as possible (for example, a device which passes the same base station or the same relay device, a device which is close in logical position, or the like). The number of process multiplexing (redundancy) by the process control unit 254 may be set to any number.

On the other hand, in a case where the device reliability is equal to or more than the standard value (step S205, No), the process control unit 254 does not additionally determine a device.

After that, the process control unit 254 transmits necessary information to the determined device (step S103 in FIG. 11).

Further, in a case where the request is a request for a plurality of related processes (step S201, Yes), the process control unit 254 determines a group of devices for executing the processes on the basis of an SLA included by the request, the device reliability information 247, and the network reliability information (step S207). For example, the process control unit 254 first selects from among devices few included in the information processing system 1 (devices with fewer options), such as devices whose necessary device reliability and network reliability are high. Subsequently, the process control unit 254 refers to the connection path information 242 and so on and selects a device satisfying a predetermined condition, such as a device in a short distance from the selected device. For example, through such processing, the process control unit 254 determines a group of devices for executing the process.

Subsequently, the process control unit 254 checks whether or not the determined group of devices include a device whose network reliability is lower than the predetermined standard value (step S208).

In a case where a device whose network reliability is lower than the standard value is included (step S208, Yes), the process control unit 254 determines to cause another group of devices having different network paths to execute the same process (step S209). The number of process multiplexing (redundancy) by the process control unit 254 may be set to any number.

On the other hand, in a case where a device whose network reliability is lower than the standard value is not included (step S208, No), the process control unit 254 checks whether or not the determined group of devices include a device whose device reliability is lower than the predetermined standard value (step S210).

In a case where a device whose device reliability is lower than the standard value is included (step S210, Yes), the process control unit 254 determines to cause another group of devices whose network paths are as identical as possible to execute the same process (step S211). The number of process multiplexing (redundancy) by the process control unit 254 may be set to any number.

On the other hand, in a case where a device whose device reliability is lower than the standard value is not included (step S210, No), the process control unit 254 does not additionally determine a group of devices.

After that, the process control unit 254 transmits necessary information to the respective devices included in the determined group of devices (step S103 in FIG. 11).

The above is an example showing in detail the process at step S102 in FIG. 11. Next, with reference to FIG. 13, an example of a process when the system management device 2 transmits a process result will be described.

With reference to FIG. 13, the process result adoption unit 255 of the system management device 2 receives the result of a process from a device requested to execute the process (step S301).

The process result adoption unit 255 checks whether or not the received process result is a process result of a multiplexed process (step S302).

In a case where the received process result is not a process result according to a multiplexed process (step S302, No), the process result adoption unit 255 transmits the received process result as it is to the cloud using terminal 3 (step S303). On the other hand, in a case where the received process result is a process result according to a multiplexed process (step S302, Yes), the process result adoption unit 255 executes a process according to a cause of process multiplexing (step S304).

For example, in a case where the process multiplexing has been executed due to low network reliability (step S304, network reliability), the process result adoption unit 255 transmits a process result having been received the earliest to the cloud using terminal 3 (step S305). On the other hand, in a case where the process multiplexing has been executed due to low device reliability (step S304, device reliability), the process result adoption unit 255, for example, compares and checks process results from the respective devices requested to execute the process (step S306). Then, the process result adoption unit 255 selects a process result to adopt by majority voting or the like, and transmits the selected process result to the cloud using terminal 3 (step S307).

The above is an example of the process executed when the system management device 2 transmits a process result.

Thus, the system management device 2 in this exemplary embodiment includes the reliability determination unit 253 and the process control unit 254. Such a configuration allows the process control unit 254 of the system management device 2 to determine a device for executing a process on the basis of an SLA included by a request and the device reliability information 247 and the network reliability information 248 generated by the reliability determination unit 253. Moreover, for example, in the case of causing a device with low device reliability and low network reliability to execute a process, the process control unit 254 can cause a plurality of devices to execute the same process. Thus, it becomes possible to, by determining a device for executing a process on the basis of an SLA included by a request and reliability information of the respective resources and also making a process multiplex as necessary, utilize various excess IT resources while maintaining the reliability of the process. As a result, it becomes possible to properly use available resources when executing a process according to a request, in accordance with the statuses of the resources or the like.

Further, the system management device 2 in this exemplary embodiment is configured to transmit information indicating a result transmission destination to a device for executing a process. With such a configuration, it becomes possible to prevent process results from concentrating on the system management device 2.

In this exemplary embodiment, the process control unit 254 determines a device for executing a process on the basis of the device reliability information 247 on the basis of the device configuration information 243 and the device status information 245 and the network reliability information 248 based on the network configuration information 244 and the network status information 246. However, the process control unit 254 may be configured to determine a device for executing a process with the use of at least only one of the device reliability information 247 and the network reliability information 248. Moreover, the process control unit 254 may be configured to determine a device for executing a process with the use of at least only one of the device configuration information 243 and the network configuration information 244 without generating the device reliability information 247 and the network reliability information 248. In this case, the process control unit 254 determines whether or not to make a process multiplex on the basis of the device configuration information 243 and the network configuration information 244. Moreover, the process control unit 254 may be configured to determine a device for executing a process with the use of at least only one of the device status information 245 and the network status information 246. In this case, the process control unit 254 determines whether or not to make a process multiplex on the basis of the device status information 245 and the network status information 246.

Further, the device configuration information 243, the network configuration information 244, the device status information 245 and the network status information 246 illustrated in this exemplary embodiment are merely examples. The device configuration information 243, the network configuration information 244, the device status information 245 and the network status information 246 may include only part of the information illustrated in this exemplary embodiment, or may include information other than illustrated in this exemplary embodiment.

Further, the terminals 6 may include a tablet, a smartphone or the like of an individual, so that it can be assumed that the terminal 6 is moving. Then, the status information acquisition unit 252 (a movement information acquisition part) may be configured to, for example, acquire information indicating the movement status of the terminal 6 (for example, detect a change of a relay device such as a communicating base station, or detect the number of changes of a relay device). Moreover, it can be assumed that a network status or the like largely varies with movement of the terminal 6. Therefore, the process control unit 254 may be configured to exclude the moving terminal 6 (or the terminal 6 that the number of changes of a relay device within a given period (may be any period) is more than a predetermined standard) from candidates of a device to be determined. In other words, the process control unit 254 can be configured to select the terminal 6 for executing a process from among the terminals 6 that the numbers of changes of communicating relay devices are equal to or less than the predetermined standard. Meanwhile, the reliability determination unit 253 may be configured to generate the network reliability information 248 in consideration of information indicating the movement status of a device.

Second Exemplary Embodiment

Figure 14:
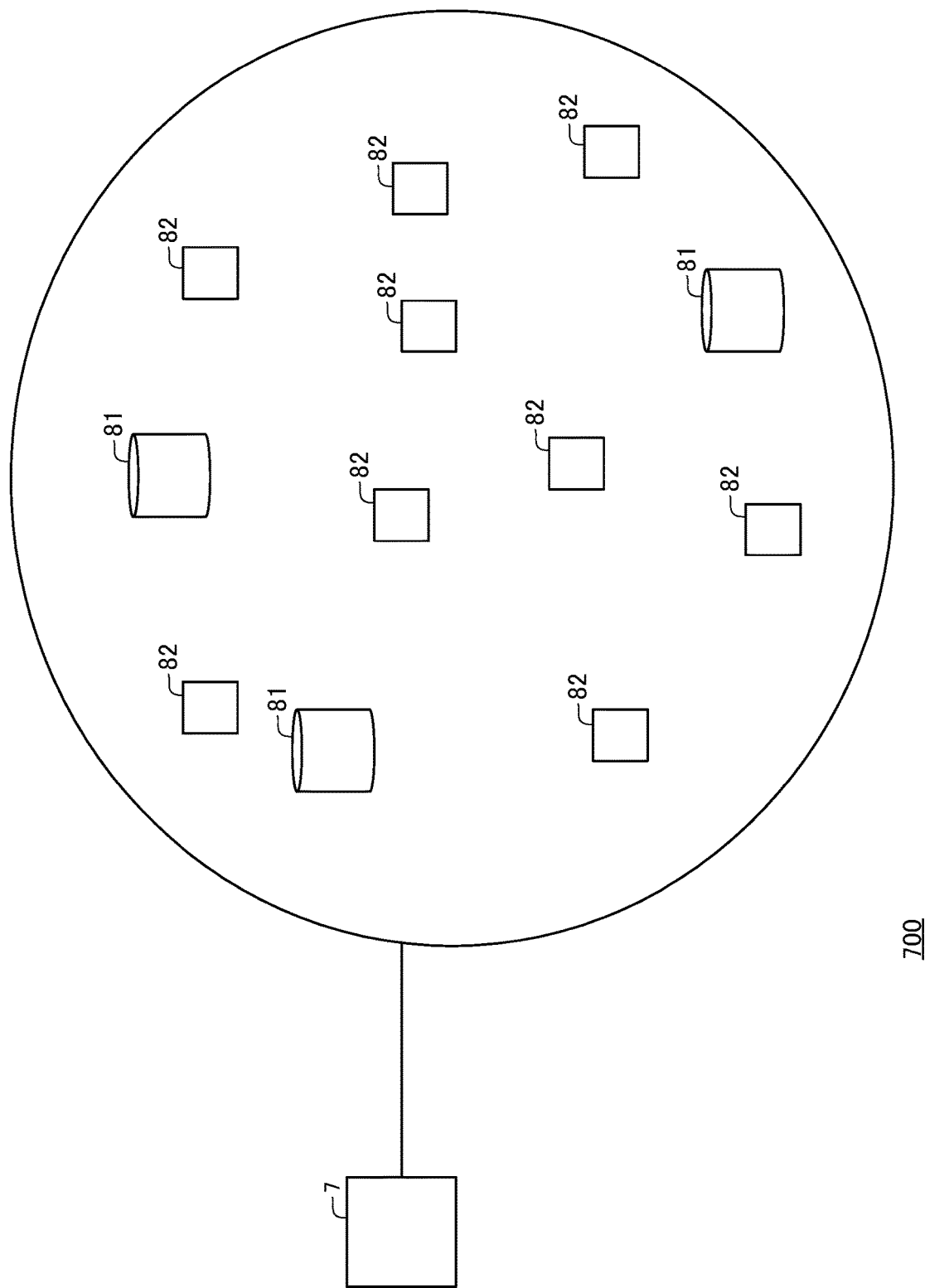
FIG. 14 is a diagram showing an example of a configuration of a whole information processing system according to a second exemplary embodiment of the present invention.
Figure 15:
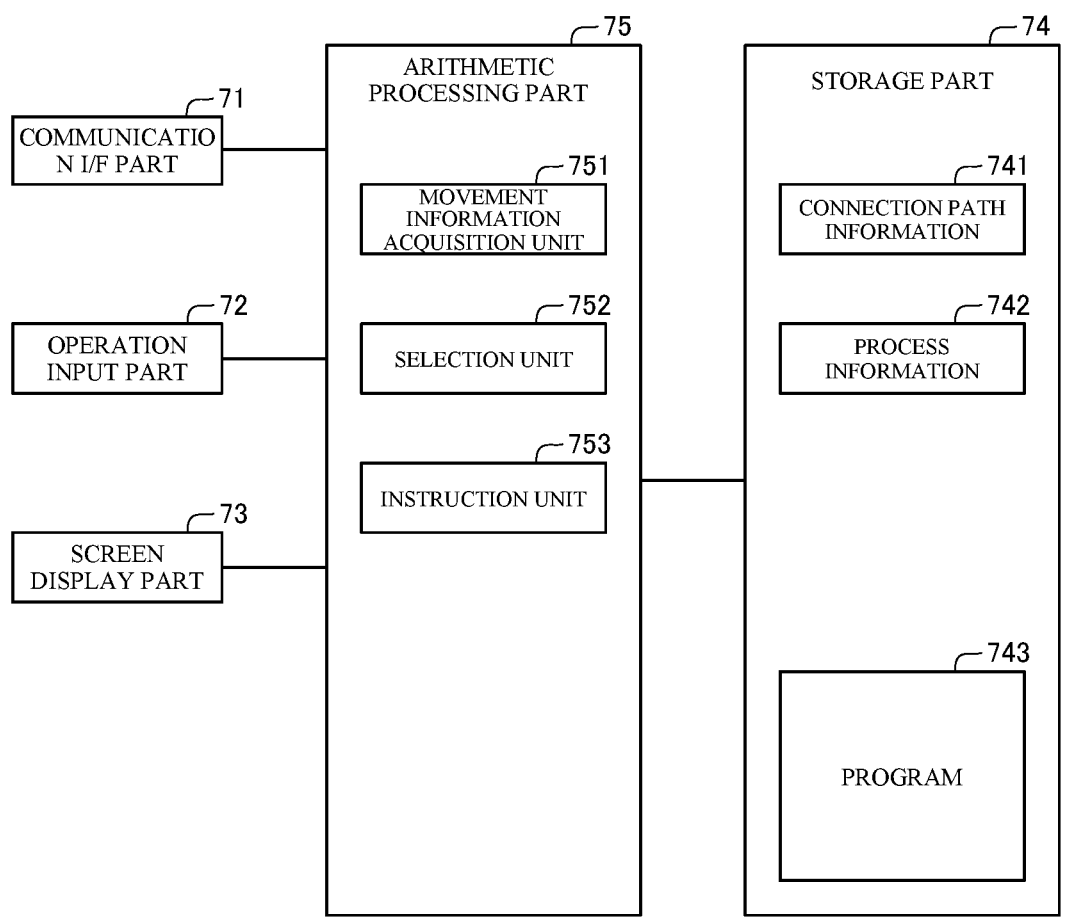
FIG. 15 is a block diagram showing an example of a configuration of a selection device shown in FIG. 14.
Figure 16:
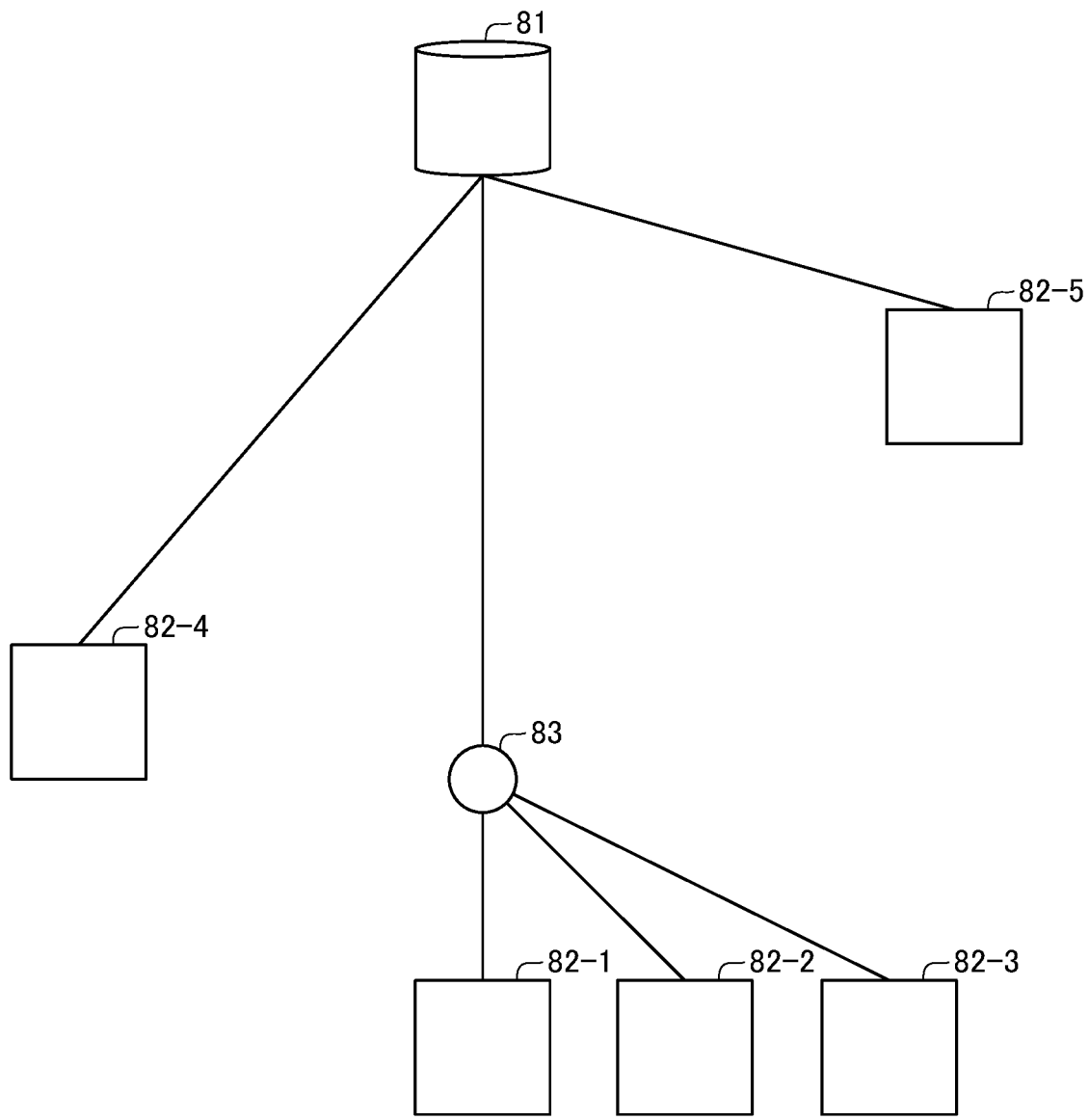
FIG. 16 is a diagram for describing an example of selection of a device for executing a process by a selection unit shown in FIG. 15.
Figure 17:
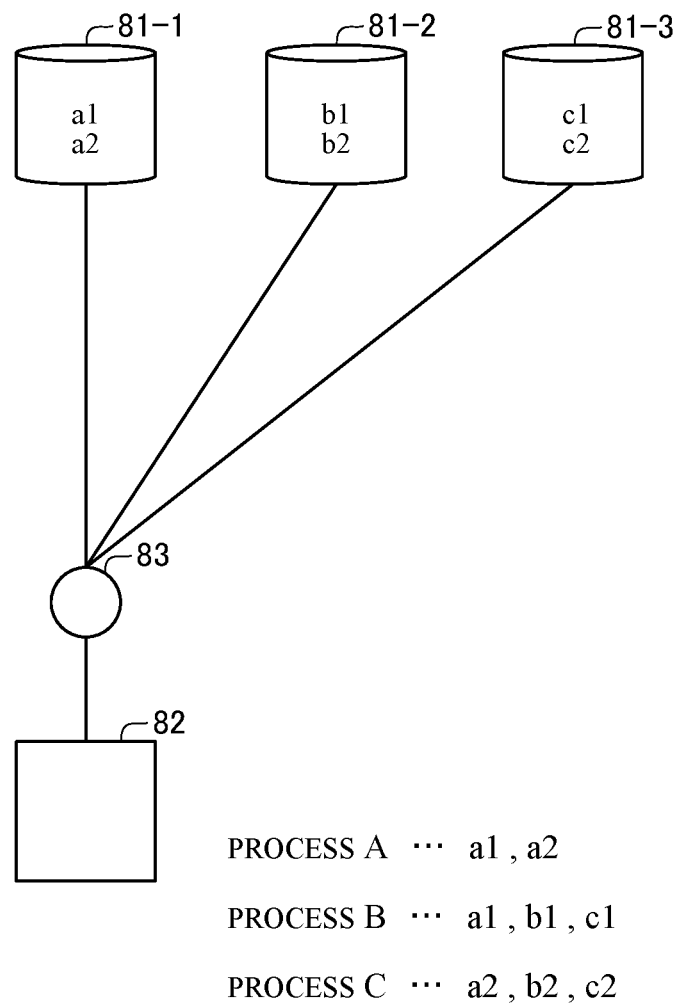
FIG. 17 is a diagram for describing another example of selection of a device for executing a process by the selection unit shown in FIG. 15.
Figure 18:
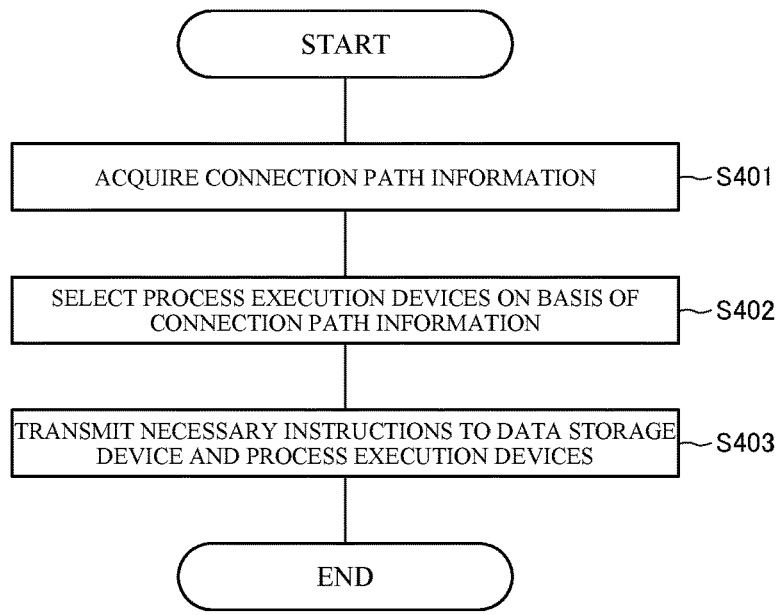
FIG. 18 is a flowchart showing an example of a device selection method executed by the selection device.
Figure 19:
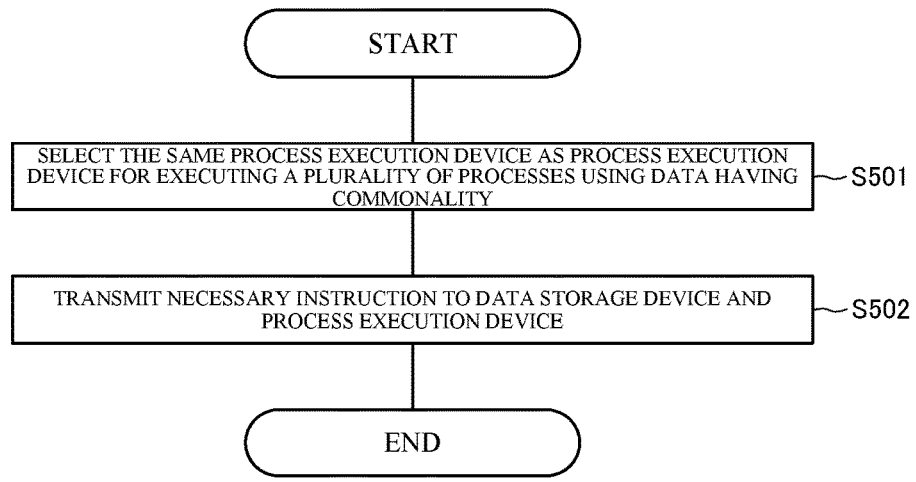
FIG. 19 is a flowchart showing an example of a device selection method executed by the selection device.

Next, with reference to FIGS. 14 to 19, a second exemplary embodiment of the present invention will be described. FIG. 14 is a diagram showing an example of a configuration of a whole information processing system 700. FIG. 15 is a block diagram showing an example of a configuration of a selection device 7. FIGS. 16 and 17 are diagrams for describing an example when a selection unit 752 selects a device for executing a process. FIGS. 18 and 19 are flowcharts showing an example of a device selection method executed by the selection device 7.

In the second exemplary embodiment of the present invention, the information processing system 700 will be described. The information processing system 700 includes the selection device 7 that selects a process execution device 82 as a device for executing a process in accordance with a request from an external device such as the cloud using terminal 3 described in the first exemplary embodiment. As will be described later, in the case of causing a plurality of process execution devices 82 to execute processes using the same data, the selection device 7 selects a plurality of devices for executing the processes so that connection paths (data distribution channels) between a data storage device 81 serving as a place where the data is stored and the plurality of process execution devices 82 for executing the processes are at least partly common. Moreover, the selection device 7 selects so that processes using the same data are executed by the same process execution device 82, thereby making connection paths (data distribution channels) between the data storage devices 81 and the process execution device 82 at least partly common. By thus selecting process execution device 82 for executing a process on the basis of a connection path between the data storage device 81 and the process execution device 82, the need for transmitting duplicate data is eliminated and increase of traffic can be inhibited. That is, network resources can be efficiently utilized.

In this exemplary embodiment, a configuration of the selection device 7 and a process executed by the selection device 7 will be mainly described. The selection device 7 described in this exemplary embodiment can be utilized when the system management device 2 described in the first exemplary embodiment determines a device requested to execute a process, and can also be utilized as a device other than the system management device 2. In other words, the selection device 7 can also be utilized as a device which selects a device for executing a process in a system which does not use the device reliability information 247 or the network reliability information 248.

With reference to FIG. 14, the information processing system 700 according to this exemplary embodiment includes at least the selection device 7, the data storage device 81 for storing data necessary for a process and so on, and the process execution device 82 selected by the selection device 7 to execute a process. Meanwhile, in this exemplary embodiment, configurations of the data storage device 81 and the process execution device 82 are not specifically limited.

The selection device 7 is connected to the data storage device 81 and the process execution device 82 via a relay device or the like which is not shown in the drawings so as to be able to communicate with each other. Moreover, the data storage device 81 is connected to at least some of the data storage devices 81 and the process execution devices 82 so as to be able to communicate with each other. The process execution device 82 is also connected to at least some of the data storage devices 81 and the process execution devices 82 so as to be able to communicate with each other.

Meanwhile, the numbers of the data storage devices 81 and the process execution devices 82 included by the information processing system 700 are not limited to those shown in FIG. 14. The information processing system 700 can include any number of data storage devices 81 and any number of process execution devices 82. Moreover, the selection device 7 may be formed by a single information processing device, or may be formed by a plurality of information processing devices.

The selection device 7 selects a process execution device 82 for executing a process in accordance with a request from an external device such as a cloud using terminal. For example, in the case of causing a plurality of process execution devices 82 to execute processes using the same data, the selection device 7 selects the plurality of process execution devices 82 for executing the processes so that connection paths between the data storage device 81 as a data storage place and the plurality of process execution devices 82 for executing the processes are at least partly common. Moreover, the selection device 7 selects the process executing device 82 so that processes using the same data are executed by the same device, thereby making connection paths between the data storage devices 81 and the process execution device 82 for executing the processes at least partly common.

With reference to FIG. 15, the selection device 7 includes, as major components, a communication I/F part 71, an operation input part 72, a screen display part 73, a storage part 74, and an arithmetic processing part 75.

The configurations of the communication I/F part 71, the operation input part 72 and the screen display part 73 are the same as the configurations of the communication I/F part 21, the operation input part 22 and the screen display part 23 described in the first exemplary embodiment. Therefore, a detailed description thereof will be omitted.

The storage part 74 is a storage device such as a hard disk and a memory. In the storage part 74, information necessary for various processes in the arithmetic processing part 75 and a program 743 are stored. The program 743 is a program loaded to and executed by the arithmetic processing part 75 to realize various processing parts. The program 743 is previously loaded from an external device (not shown) or a storage medium (not shown) via a data input and output function such as the communication I/F part 71, and stored into the storage part 74. Major information stored in the storage part 74 include, for example, connection path information 741, process information 742, and so on.

The connection path information 741 is information indicating a connection path on a network between the data storage device 81 and the process execution device 82. The connection path information 741 includes information indicating a connection path between the data storage device 81 and the process execution device 82.

The connection path information 741 is generated by, for example, previously acquiring necessary information from the data storage device 81 and the process execution device 82, and relay devices and the like which are not shown in the drawings on the way of communication with the data storage device 81 and the process execution device 82. The information may be collected by various known methods. Moreover, the connection path information 741 may be regularly updated. The connection path information 741 is utilized by the selection unit 752.

The process information 742 indicates information at the time of requesting a process by the selection unit 752 in the past. The process information 742 includes, for example, information for identifying a requested process execution device 82, a requested process, and information for identifying data needed at the time of execution of the requested process. The process information 742 is stored, for example, by the selection unit 752 when the selection unit 752 selects the process execution device 82 for executing a process. The information included by the process information 742 may be deleted at a timing for deleting data used for execution of a process by the process execution device 82.

The arithmetic processing part 75 has a microprocessor such as an MPU and a peripheral circuit thereof. The arithmetic processing part 75 loads the program 743 from the storage part 74 and executes it, thereby causing the abovementioned hardware and the program 743 to cooperate and realizing various processing parts. Major processing parts realized by the arithmetic processing part 75 are a movement information acquisition unit 751, a selection unit 752 (a selection part), and an instruction unit 753.

The movement information acquisition unit 751 acquires movement information of the process execution device 82, for example, for each predetermined period or at a timing when device selection is required. Then, the movement information acquisition unit 751 transmits the acquired movement information to the selection unit 752. The movement information acquisition unit 751 may store the acquired movement information into the storage part 74.

For example, the movement information acquisition unit 751 performs communication with the process execution device 82 and a relay device or the like which is not shown in the drawings on the way of communication with the process execution device 82, and acquires movement information indicating whether or not the process execution device 82 is moving and a movement status or the like when the process execution device 82 is moving. For example, the movement information indicates a change of a relay device with which the process execution device 82 communicates, the number of changes, and so on. Meanwhile, in this exemplary embodiment, a method used when the movement information acquisition unit 751 acquires the movement information is not specifically limited. The movement information acquisition unit 751 can acquire the movement information by various known methods, for example, by detecting a change of a relay device such as a base station communicating with the process execution device 82.

The selection unit 752 selects a device for executing a process from among the process execution devices 82 on the basis of a request from a cloud using terminal or the like which is not shown in the drawings. Then, the selection unit 752 transmits information indicating the result of selection to the instruction unit 753.

For example, in the case of making a process redundant or depending on a process content and so on, the selection unit 752 may cause a plurality of process execution devices 82 to execute the same or different processes using the same data. In such a case, the selection unit 752 refers to the connection path information 741. Then, on the basis of the connection path information 741 having been referred to, the selection unit 752 selects a plurality of process execution devices 82 for executing processes so that connection paths between the data storage device 81 and the plurality of process execution devices 82 for executing the processes are at least partly common. To be specific, for example, the selection unit 752 selects a plurality of process execution devices 82 whose connection paths from the data storage device 81 to a given position such as a relay device coincide with each other, as the process execution devices 82 for executing the processes.

For example, it is assumed that, as shown in FIG. 16, the data storage device 81 and the process execution devices 82 are connected. In the case shown in FIG. 16, connection paths of the process execution devices 82-1, 82-2 and 82-3 coincide from the data storage device 81 to a given position such as a relay device 83 (a network switch, the process execution device 82, or the like). On the other hand, the abovementioned connection paths do not coincide with any of connection paths of the process execution devices 82-4 and 82-5. Then, in the case of causing the process execution devices 82 to execute a plurality of processes using the same data, the selection unit 752 selects the process execution devices 82 for executing the processes from among the process execution devices 82-1, 82-2 and 82-3. For example, in the case of causing the process execution devices 82 to execute two processes using the same data, the selection unit 752 selects any two of the process execution devices 82-1, 82-2 and 82-3 (a method for selection is not limited) as the process execution devices 82 for executing the processes. Thus, the selection unit 752 selects the process execution devices 82 for executing processes on the basis of connection paths between the data storage device 81 and the process execution devices 82.

Meanwhile, the following case is assumed; there are a plurality of groups each including a plurality of process execution devices 82 whose connection paths from the data storage device 81 to a given position such as the relay device 83 coincide. The selection unit 752 can be configured to, in this case, refer to the connection path information 741, calculate a distance ratio of coincident sections, the shortness of a connection path between the data storage device 81 and the process execution device 82, the length of sections which do not consistent and so on, and select the process execution devices 82 on the basis of the result of the calculation. That is, the selection unit 752 can be configured to, in a case where there are a plurality of groups each including a plurality of process execution devices 82 whose connection paths from the data storage device 81 to a given position such as a relay device coincide with each other, select a group in which the distance ratio of coincident sections is higher, a group in which the whole paths are shorter, or the like. The selection unit 752 may select the process execution devices 82 by any method other than the method illustrated above.

Further, for example, there may be commonality in used data in a plurality of processes. For example, in FIG. 17, a process A uses data a1 and data a2, a process B uses the data a1, data b1 and data c1, and a process C uses the data a2, data b2 and data c2. That is, part of the data used by the process B and part of the data used by the process C are the same as part of the data used by the process A. In a case where there is commonality in used data in a plurality of processes in the abovementioned manner, the selection unit 752 selects the process execution device 82 so that processes using the same data are executed by the same device. For example, in FIG. 17, the selection unit 752 selects the process execution device 82 so that all of the process A, the process B and the process C are executed by the same device. By thus selecting the process execution devices 82, as shown in FIG. 17, connection paths from a given position such as the relay device 83 to the process execution devices 82 coincide.

Meanwhile, the selection unit 752 can refer to the process information 742 and thereby cause the same process execution device 82 to execute a process using data which is common with data used in a process executed by the process execution device 82 in the past. Thus, the selection unit 752 can select the process execution device 82 for executing a process not only when causing devices to execute a plurality of processes using data having commonality but also when causing a device to execute a process in relation to a process executed in the past.

In the above manner, in the case of causing devices to execute a plurality of processes using the same data, or in the case of causing a device to execute a plurality of processes using data having commonality, the selection unit 752 selects the process execution device 82 so that at least paths between the data storage device 81 and the process execution devices 82 or between the data storage devices 81 and the process execution device 82 are at least partly common.

The selection unit 752 can be configured to, when selecting the process execution device 82, refer to movement information acquired by the movement information acquisition unit 751. For example, when the process execution device 82 moves, its connection path changes, so that the coincidence of connection paths may be lost. Therefore, the selection unit 752 excludes the moving process execution device 82 (or the process execution device 82 whose relay device has changed more than a predetermined standard number of times within a given period (may be any period)) from the candidates of a device to be selected on the basis of the movement information. In other words, the selection unit 752 selects the process execution device 82 for executing a process from among the process execution devices 82 whose communicating relay device has changed the predetermined standard number of times or less. For example, by thus configuring the selection unit 752, it becomes possible to more securely select the process execution devices 82 whose paths are at least partly common, and it becomes possible to more securely utilize network resources with efficiency.

The instruction unit 753 gives necessary instructions to the data storage device 81 and the process execution device 82 on the basis of the result of selection by the selection unit 752.

For example, the instruction unit 753 receives information indicating a selection result from the selection unit 752. Then, on the basis of the received information, the instruction unit 753 transmits a process content, a resources reservation period and information indicating a result transmission destination to the process execution device 82 selected by the selection unit 752. Moreover, on the basis of the received information, the instruction unit 753 instructs the data storage device 81 to transmit data necessary for process execution to the process execution device 82 selected by the selection unit 752.

The above is an example of the configuration of the selection device 7. Next, with reference to FIGS. 18 and 19, an example of a flow when the selection device 7 selects the process execution device 82 will be described. Firstly, with reference to FIG. 18, an example of a process executed by the selection device 7 when causing a plurality of process execution devices 82 to execute the same or different processes using the same data will be described.

The selection device 7 receives a request from a cloud using terminal or the like which is not shown in the drawings, for example. Now, it is assumed that, in accordance with the received request, the selection device 7 causes a plurality of process execution devices 82 to execute the same or different processes using the same data. Then, as shown in FIG. 18, the selection unit 752 refers to the connection path information 741 stored in the storage part 74 (step S401).

On the basis of the connection path information 741 having been referred to, the selection unit 752 selects a plurality of process execution devices 82 for executing processes so that connection paths between the data storage device 81 and the plurality of process execution devices 82 for executing the processes are at least partly common (step S402). For example, the selection unit 752 selects a plurality of process execution devices 82 whose connection paths from the data storage device 81 to a given point such as a relay device coincide, as the process execution devices 82 for executing the processes. After that, the selection unit 752 transmits the selection result to the instruction unit 753.

The instruction unit 753 gives necessary instructions to the data storage device 81 and the process execution devices 82 on the basis of the result of the selection by the selection unit 752 (step S403). For example, the instruction unit 753, on the basis of the received information, transmits a process content, a resources reservation period and information indicating a result transmission destination to the process execution devices 82 selected by the selection unit 752. Moreover, the instruction unit 753 instructs the data storage device 81 to transmit data necessary for execution of the processes to the process execution devices 82 selected by the selection unit 752 on the basis of the received information.

The above is an example of the process executed by the selection unit 7 when causing a plurality of process execution devices 82 to execute the same or different processes using the same data. Next, with reference to FIG. 19, an example of a process executed by the selection device 7 when there is commonality in data used in a plurality of processes.

The selection device 7 receives a request from a cloud using terminal or the like which is not shown in the drawings, for example. Now, it is assumed that, in accordance with the received request, the selection device 7 causes a plurality of process execution devices 82 to execute a plurality of processes whose data have commonality. Then, as shown in FIG. 19, the selection unit 752 selects the process execution devices 82 so that a plurality of processes whose data have commonality are executed by the same process execution device 82 (step S501). After that, the selection unit 752 transmits the result of the selection to the instruction unit 753.

The instruction unit 753 gives necessary instructions to the data storage device 81 and the process execution device 82 on the basis of the result of the selection by the selection unit 752 (step S502). For example, on the basis of the received information, the instruction unit 753 transmits a process content, a resources reservation period and information indicating a result transmission destination to the process execution devices 82 selected by the selection unit 752. Moreover, on the basis of the received information, the instruction unit 753 instructs the data storage device 81 to transmit data necessary for process execution to the process execution device 82 selected by the selection unit 752.

The above is an example of the process executed by the selection device 7 in a case where there is commonality in data used in a plurality of processes. Meanwhile, the selection unit 752 may refer to the process information 742 before processing at step S501.

Thus, the selection device 7 according to this exemplary embodiment stores the connection path information 741 and has the selection unit 752. With such a configuration, when causing the process execution devices 82 to execute a plurality of processes using the same data and when causing the process execution devices 82 to execute a plurality of processes using data having commonality, the selection unit 752 can select the process execution devices 82 so that paths between the data storage device 81 and the process execution devices 82 are at least partly common. As a result, the need for transmitting duplicate data is eliminated, and increase of traffic can be inhibited. That is, it becomes possible to efficiently utilize network resources.

Third Exemplary Embodiment

Next, with reference to FIG. 20, a third exemplary embodiment of the present invention will be described. In the third exemplary embodiment, the overview of a configuration of a selection device 9 will be described.

Figure 20:
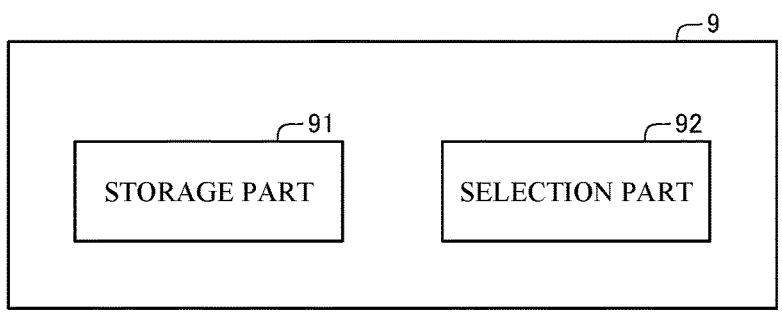
FIG. 20 is a block diagram showing an example of a configuration of a selection device according to a third exemplary embodiment of the present invention.

With reference to FIG. 20, the selection device 9 has a storage part 91 and a selection part 92. For example, the selection device 9 has a storage device and an arithmetic device, which are not shown in the drawings. The selection part 92 is realized by execution of a program stored in the storage device by the arithmetic device.

The storage part 91 is a storage device such as a memory and a hard disk. In the storage part 91, connection path information indicating a connection path of a device is stored.

The selection unit 92 selects devices for executing a process from among a plurality of devices. For example, on the basis of the connection path information stored in the storage part 91, the selection unit 92 selects devices whose paths from a place to store data used for a process are at least partly common as the devices for executing the process.

Thus, the selection device 9 stores the connection path information and has the selection part 92. Such a configuration allows the selection part 92 to select devices for executing a process so that paths from a place to store data used for the process to the devices are at least partly common. As a result, the need for transmitting duplicate data is eliminated, and increase of traffic is inhibited. That is, it becomes possible to efficiently use network resources.

Further, the selection device 9 can be realized by installation of a given program into the selection device 9. To be specific, a program as another aspect of the present invention is a computer program comprising instructions for causing an information processing device to realize a selection unit (the selection part 92). The information processing device includes the storage part 91 in which connection path information indicating a connection path of a device is stored. The selection unit is configured to select, as devices for executing a process, devices whose paths from a place to store data used in the process to the devices are at least partly common on the basis of the connection path information.

Further, a device selection method executed by the selection device 9 is a device selection method executed by the selection device 9 including the storage part 91 in which connection path information indicating a connection path of a device is stored. The device selection method includes: acquiring the connection path information indicating the connection path of the device; and selecting, as devices for executing a process, devices whose paths from a place to store data used in the process to the devices are at least partly common on the basis of the acquired connection path information.

Inventions of a program and a device selection method having the configurations described above have the same actions as the selection device 9, and therefore, can achieve the object of the present invention stated above.

<Supplementary Notes>

The whole or part of the exemplary embodiments disclosed above can be described as the following supplementary notes. Below, the outline of the selection device and so on according to the present invention will be described. However, the present invention is not limited to the following configuration.

(Supplementary Note 1)

A selection device comprising:

a storage part in which connection path information indicating a connection path of a device is stored; and a selection part configured to select the device for executing a process from among the plurality of devices, wherein the selection part is configured to select, as the devices for executing a process, the devices whose paths from a place to store data used in the process to the devices are at least partly common on a basis of the connection path information.

(Supplementary Note 2)

The selection device according to Supplementary Note 1, wherein the selection part is configured to, when causing the devices to execute processes using same data, select, as the devices for executing the processes, the devices whose paths from the place to store the data used in the processes to the devices are at least partly common on a basis of the connection path information.

(Supplementary Note 3)

The selection device according to Supplementary Note 1 or 2, wherein the selection part is configured to, when causing the devices to execute processes using same data, select, as the devices for executing the processes, the devices whose connection paths from the place to store the data used in the processes to a predetermined place coincide on a basis of the connection path information.

(Supplementary Note 4)

The selection device according to any of Supplementary Notes 1 to 3, wherein the selection part is configured to select the device for executing a process so that a plurality of processes using same data are executed by a same device.

(Supplementary Note 5)

The selection device according to any of Supplementary Notes 1 to 4, comprising a movement information acquisition part configured to acquire movement information of the device, wherein the selection part is configured to select the device for executing a process from among the devices whose movement information acquired by the movement information acquisition part satisfy a predetermined condition of the plurality of devices.

(Supplementary Note 6)

The selection device according to Supplementary Note 5, wherein:

the movement information includes information indicating a number of changes of a relay device with which the device communicates; and the selection part is configured to select the device for executing a process from among the devices whose numbers of changes of communicating relay devices are equal to or less than a predetermined standard on a basis of the movement information.

(Supplementary Note 7)

A device selection method executed by a selection device including a storage part in which connection path information indicating a connection path of a device is stored, the device selection method comprising:

acquiring the connection path information indicating the connection path of the device; and selecting, as the devices for executing a process, the devices whose paths from a place to store data used in the process to the devices are at least partly common on a basis of the acquired connection path information.

(Supplementary Note 8)

The device selection method according to Supplementary Note 7, comprising, when causing the plurality of devices to execute processes using same data, selecting, as the devices for executing the processes, the devices whose paths from the place to store the data used in the processes to the devices are at least partly common on a basis of the connection path information.

(Supplementary Note 9)

The device selection method according to Supplementary Note 7, comprising:

when causing the plurality of devices to execute processes using same data, selecting, as the devices for executing the processes, the devices whose connection paths from the place to store the data used in the processes to a predetermined place coincide on a basis of the connection path information.

(Supplementary Note 10)

The device selection method according to Supplementary Note 7, comprising:

selecting the device for executing a process so that a plurality of processes using same data are executed by a same device.

(Supplementary Note 11)

The device selection method according to Supplementary Note 7, comprising:

acquiring movement information of the device; and selecting the device for executing a process from among the devices whose movement information having been acquired satisfies a predetermined condition of the plurality of devices.

(Supplementary Note 12)

The device selection method according to Supplementary Note 11, wherein the movement information includes information indicating a number of changes of a relay device with which the device communicates, the device selection method comprising:

selecting the device for executing a process from among the devices whose numbers of changes of communicating relay devices are equal to or less than a predetermined standard, on a basis of the movement information.

(Supplementary Note 13)

A non-transitory computer-readable medium storing a computer program comprising instructions for causing an information processing device to realize a selection unit, the information processing device including a storage part in which connection path information indicating a connection path of a device is stored, the selection unit being configured to select the device for executing a process from among the plurality of devices, wherein the selection unit is configured to select, as the devices for executing a process, the devices whose paths from a place to store data used in the process to the devices are at least partly common on a basis of the connection path information.

(Supplementary Note 14)

The non-transitory computer-readable medium storing the computer program according to Supplementary Note 13, wherein the selection unit is configured to, when causing the plurality of devices to execute processes using same data, select, as the devices for executing the processes, the devices whose paths from the place to store the data used in the processes to the devices are at least partly common on a basis of the connection path information.

(Supplementary Note 15)

The non-transitory computer-readable medium storing the computer program according to Supplementary Note 13, wherein the selection unit is configured to, when causing the plurality of devices to execute processes using same data, select, as the devices for executing the processes, the devices whose connection paths from the place to store the data used in the processes to a predetermined place coincide on a basis of the connection path information.

(Supplementary Note 16)

The non-transitory computer-readable medium storing the computer program according to Supplementary Note 13, wherein the selection unit is configured to select the device for executing a process so that a plurality of processes using same data are executed by a same device.

(Supplementary Note 17)

The non-transitory computer-readable medium storing the computer program according to Supplementary Note 13, comprising instructions for causing the information processing device to realize a movement information acquisition unit configured to acquire movement information of the device, wherein the selection unit is configured to select the device for executing a process from among the devices whose movement information acquired by the movement information acquisition unit satisfy a predetermined condition of the plurality of devices.

(Supplementary Note 18)

The non-transitory computer-readable medium storing the computer program according to Supplementary Note 17, wherein:

the movement information includes information indicating a number of changes of a relay device with which the device communicates; and the selection unit is configured to select the device for executing a process from among the devices whose numbers of changes of communicating relay devices are equal to or less than a predetermined standard on a basis of the movement information.

The program disclosed in the exemplary embodiments and supplementary notes is stored in a storage device or recorded on a computer-readable recording medium. For example, the recording medium is a portable medium such as a flexible disk, an optical disk, a magneto-optical disk, and a semiconductor memory.

Although the present invention has been described above with reference to the exemplary embodiments, the present invention is not limited to the exemplary embodiments described above. The configurations and details of the present invention can be changed in various manners that can be understood by one skilled in the art within the scope of the present invention.

DESCRIPTION OF REFERENCE NUMERALS 1 information processing system
2 system management device
21 communication I/F part
22 operation input part
23 screen display part
24 storage part
241 SLA list information
242 connection path information
243 device configuration information
244 network configuration information
245 device status information
246 network status information
247 device reliability information
248 network reliability information
249 program
25 arithmetic processing part
251 request control unit
252 status information acquisition unit
253 reliability determination unit
254 process control unit
255 process result adoption unit
3 cloud using terminal
4 corporate DC
5 edge server
6 terminal
7 selection device
700 information processing system
71 communication I/F part
72 operation input part
73 screen display part
74 storage part
741 connection path information
742 process information
743 program
75 arithmetic processing part
751 movement information acquisition unit
752 selection unit
753 instruction unit
81 data storage device
82 process execution device
83 relay device
9 selection device
91 storage part
92 selection part

The invention claimed is:

1. A device selection method executed by a selection device storing connection path information and process information, the connection path information indicating a connection path between a plurality of process execution devices and a data storage device in which data to be used for a process is stored, the process information indicating information regarding selection of the process execution devices in the past and including information indicating data that was used in a process, the device selection method comprising:

acquiring the connection path information indicating the connection path; and when causing the process execution devices to execute processes using given data, selecting, on the basis of the connection path information, the process execution devices in which paths between a storage location of the data to be used for the process and the process execution devices are at least partly in common, and select, on the basis of the process information, the process execution devices so as to cause same process execution device to execute a process using data that is common with the data that was used in the process executed in the past.

2. The device selection method according to claim 1, comprising:

causing the plurality of the process execution devices to execute processes using the given data of the data stored in the data storage device, and selecting, as the process execution devices for executing the processes, the process execution devices whose connection paths from the data storage device to a predetermined place coincide with each other on a basis of the connection path information.

3. The device selection method according to claim 1, comprising:
acquiring movement information of the process execution devices; and
selecting the process execution device for executing a process from among the devices whose movement information having been acquired satisfies a predetermined condition of the plurality of process execution devices.

4. The device selection method according to claim 3, wherein the movement information includes information indicating a number of changes of a relay device with which the process execution device communicates, the device selection method comprising:
selecting the process execution device for executing a process from among the process execution devices whose numbers of changes of communicating relay devices are equal to or less than a predetermined standard, on a basis of the movement information.

5. A selection device comprising:
a processor; and
a memory storing instructions executable by the processor to:
store connection path information and process information is stored, the connection path information indicating a connection path between a plurality of process execution devices and a data storage device in which data to be used for a process is stored, the process information indicating information regarding selection of the process execution devices in the past and including information indicating data that was used in a process; and
when causing a plurality of the process execution devices to execute processes using given data, select, on the basis of the connection path information, the process execution devices in which paths between a storage location of the data to be used for the process and the process execution devices are at least partly in common, and select, on the basis of the process information, the process execution devices so as to cause same process execution device to execute a process using data that is common with the data that was used in the process executed in the past.

6. The selection device according to claim 5, wherein the instructions are executable by the processor to further cause a plurality of the process execution devices to execute processes using the given data of the data stored in the data storage device, and select, as the process execution devices for executing the processes, the process execution devices whose connection paths from the data storage device to a predetermined place coincide with each other, on a basis of the connection path information.

7. The selection device according to claim 5, wherein the instructions are executable by the processor to further:
acquire movement information of the process execution devices;
select the process execution device for executing a process from among the process execution devices whose movement information acquired by the movement information acquisition part satisfy a predetermined condition of the plurality of the process execution devices.

8. The selection device according to claim 7, wherein:
the movement information includes information indicating a number of changes of a relay device with which the process execution device communicates; and
the instructions are executable by the processor to further select the process execution device for executing a process from among the process execution devices whose numbers of changes of communicating relay devices are equal to or less than a predetermined standard on a basis of the movement information.

9. A non-transitory computer-readable medium storing a computer program comprising instructions executable by a selection device to perform a selection method comprising:
storing connection path information and process information, the connection path information indicating a connection path between a plurality of process execution devices and a data storage device in which data to be used for a process is stored, the process information indicating information regarding selection of the process execution devices in the past and including information indicating data that was used in a process;
acquiring the connection path information indicating the connection path; and
when causing the process execution devices to execute processes using given data, selecting, on the basis of the connection path information, the process execution devices in which paths between a storage location of the data to be used for the process and the process execution devices are at least partly in common, and select, on the basis of the process information, the process execution devices so as to cause same process execution device to execute a process using data that is common with the data that was used in the process executed in the past.

10. The non-transitory computer-readable medium storing the computer program according to claim 9, wherein the method further comprises causing a plurality of the plurality of the process execution devices to execute processes using the given data of the data stored in the data storage device, and selecting, as the process execution devices for executing the processes, the process execution devices whose connection paths from the data storage device to a predetermined place coincide with each other on a basis of the connection path information.

11. The non-transitory computer-readable medium storing the computer program according to claim 9, wherein the method further comprising:
acquiring movement information of the device;
selecting the process execution device for executing a process from among the devices whose movement information acquired by the movement information acquisition unit satisfy a predetermined condition of the plurality of process execution devices.

12. The non-transitory computer-readable medium storing the computer program according to claim 11, wherein:
the movement information includes information indicating a number of changes of a relay device with which the process execution device communicates; and
the method further comprises selecting the process execution device for executing a process from among the process execution devices whose numbers of changes of communicating relay devices are equal to or less than a predetermined standard on a basis of the movement information.

\* \* \* \* \*